(12) United States Patent
Dallenbach et al.

(10) Patent No.: US 11,288,643 B2
(45) Date of Patent: Mar. 29, 2022

(54) MOBILE BANKING SYSTEM AND METHOD

(71) Applicant: Global Compassion, LLC, Burlington, NJ (US)

(72) Inventors: David Dallenbach, Ringoes, NJ (US); Steven Turner, New Hope, PA (US)

(73) Assignee: GLOBAL COMPASSION, LLC, Burlington, NJ (US)

( * ) Notice: Subject to any disclaimer, the term of this patent is extended or adjusted under 35 U.S.C. 154(b) by 1054 days.

(21) Appl. No.: 15/550,068

(22) PCT Filed: Feb. 11, 2016

(86) PCT No.: PCT/US2016/017443
§ 371 (c)(1),
(2) Date: Aug. 10, 2017

(87) PCT Pub. No.: WO2016/130739
PCT Pub. Date: Aug. 18, 2016

(65) Prior Publication Data
US 2018/0025331 A1 Jan. 25, 2018

Related U.S. Application Data

(60) Provisional application No. 62/114,663, filed on Feb. 11, 2015.

(51) Int. Cl.
*G06Q 40/00* (2012.01)
*G06Q 20/10* (2012.01)
(Continued)

(52) U.S. Cl.
CPC .......... *G06Q 20/10* (2013.01); *G06Q 20/204* (2013.01); *G06Q 20/206* (2013.01);
(Continued)

(58) Field of Classification Search
CPC ...................................... G06Q 40/00
(Continued)

(56) References Cited

U.S. PATENT DOCUMENTS 8,489,505 B2 7/2013 Marshall
2010/0299212 A1 11/2010 Graylin et al.
(Continued)

FOREIGN PATENT DOCUMENTS

WO 2013/158016 10/2013

*Primary Examiner* — Ojo O Oyebisi
(74) *Attorney, Agent, or Firm* — Clark & Brody LP

(57) ABSTRACT

A mobile banking system and method allows an unbanked individual to engage in banking practices that would otherwise not be available to the individual due to the individual not having a bank account and not being able to cash checks, make deposits, etc. The mobile banking system allows the unbanked individual to create a registered system account and become a customer of the system. This system account allows the customer to make deposits at credit unions and merchants who are part of the mobile banking system. The customer can also withdraw funds from a merchant or make purchases from a merchant. The customer can also make donations to a desired donation receiver and create a wallet that allows the customer to allocate funds to cards in the wallet and allow individuals access to the cards and money associated with a card.

16 Claims, 24 Drawing Sheets

(51) Int. Cl.
*G06Q 20/40* (2012.01)
*G06Q 20/32* (2012.01)
*G06Q 20/20* (2012.01)
*G06Q 20/36* (2012.01)

(52) U.S. Cl.
CPC ....... *G06Q 20/322* (2013.01); *G06Q 20/3221* (2013.01); *G06Q 20/36* (2013.01); *G06Q 20/40* (2013.01)

(58) Field of Classification Search
USPC .......................................................... 705/39
See application file for complete search history.

(56) References Cited

U.S. PATENT DOCUMENTS

| | | |
|---|---|---|
| 2012/0136785 A1 | 5/2012 | Kreamer |
| 2013/0046687 A1* | 2/2013 | Simpson, Jr. .......... G06Q 40/02 705/40 |
| 2013/0339242 A1 | 12/2013 | McHugh et al. |
| 2014/0101048 A1* | 4/2014 | Gardiner ............ G06Q 20/3276 705/44 |
| 2014/0156512 A1 | 6/2014 | Rahman et al. |
| 2014/0310172 A1* | 10/2014 | Grossman .............. G06Q 20/42 705/44 |
| 2014/0358754 A1* | 12/2014 | Breeden ................ G06Q 50/10 705/35 |
| 2015/0032588 A1 | 1/2015 | Skoff |
| 2015/0032635 A1 | 1/2015 | Guise |

* cited by examiner

MOBILE BANKING SYSTEM AND METHOD

FIELD OF THE INVENTION

The present invention is in the field of electronic payment systems and methods including banking and financial networks.

BACKGROUND ART

CellFunds is a cash management tool that will release the economic power of the unbanked. This is possible because of its ease of use, with functionality executed in seconds as opposed to the hours spent managing a cash based lifestyle. There are 80-85 million unbanked people in the USA. That number approaches 3-4 billion worldwide. People are unbanked because they cannot pass credit checks, are not comfortable with financial institutions, or do not find value in having bank accounts. This group used to be comprised largely of people in the first two groups, but studies show that a growing number from Millennials are pushing the mix more into those who do not have bank accounts by choice.

The absence of a bank account requires unbanked people to carry cash and to hide surplus cash in "safe places" until the cash is needed. Safe places may include "mattresses", family and friends. Their need or choice to live in a cash economy restricts their movement of cash to how fast they can walk or drive. Expenses are paid in cash which requires time and travel, or paid with money orders purchased at post offices and sent or hand delivered to vendors, incurring the corresponding fees. Checks are cashed at check cashing locations where they incur the fees of up to 5% of the value of the check, depending on the amount and related circumstances. Those who earn money in one location and send money to their family members in another location have to use Money Service Businesses to execute the remittance transaction because they do not have banks available to them. They incur high fees for this service as well, not to mention the time spent standing in lines executing the remittance transaction.

SUMMARY OF THE INVENTION

CellFunds was created to change the lives of the "unbanked" socio-economic group by moving cash from their pockets and "safe places" into an FDIC insured pooled account, accessible with their smart phone or debit card, without a personal bank account required. Since their cash is accessible through their smart phone or their debit card, they can execute remittances, pay bills, and manage their money 24 hours a day, 7 days a week from the comfort of anywhere. Utilizing the inventive mobile banking system of the present invention, the "unbanked" group are not restricted to normal business hours and do not spend time standing in lines. The "unbanked", with an invention can use their debit card anywhere debit cards are accepted worldwide, and also have access to ATM machines. Deposits can be made into their. CellFunds system account, via payroll direct deposit, snap check through their smart phone, or cash deposits at a local credit union linked to the Credit Union Shared Services Network (5,300 nationwide) initiated and completed through their smart phone and executed by CellFunds Systems. They may also use a deposit receiving CellFunds merchant. The deposit transaction is also initiated and completed through their smart phone and executed by CellFunds Systems. Again, no personal bank account is required. Since the fees incurred for the use of CellFunds are less than half of what their current fees are, more of their hard earned money remains with them. The time saved by using CellFunds provides them more quality time with friends or family.

The CellFunds App is built with AES encryption, with USA government approved FIPS 140-2 NSA/NIST level security added to provide a second layer of protection. Nothing is stored on the customer's smart phone accept the CellFunds App. The App requires a PIN to open, and a separate PIN to execute transactions. The PINs are not stored on the phone. No money is "stored" on the phone. If a customer loses their smart phone, all they have lost related to CellFunds is the convenience of CellFunds until they acquire a new phone. All smart phone transaction information is stored in CellFunds System, which is also encrypted with the security referenced above. We value the privacy and security of our customers.

CellFunds allows our customers to experience the benefits of cash moving at the speed of CellFunds App commands (speed of the internet) instead of the speed of their walk.

The inventive system and method has a number of features, which are detailed below:

CellFunds Registration

1. CellFunds Consumer Customers and CellFunds Merchant Customers have an account that is linked directly to their smart phone with numerous features executed via their smart phone through the CellFunds Consumer App and the CellFunds Merchant App. These app driven features available through CellFunds allows the system to provide expanded services to the unbanked community.
2. Since the smart phone has become a way of life and is involved in many aspects of life, utilizing it for financial transactions enhances the value of the smart phone to the CellFunds customer and makes their life easier by saving time and money as described below.

Deposits

1. Cash deposits can be made at financial institutions that partner with CellFunds, but does not require the customer to have an account at that financial institution. The financial institution is a door for the customer to make deposits to their CellFunds account. They have the security of the institution with immediate access to their funds without the personal account relationship due to the deposit process CellFunds has designed.
2. Cash deposits can be made at a merchant who partners with the system to provide this service, all through their smart phone. Cash is immediately accessible by the customer.
3. Check deposits can be made utilizing the snap check feature available via their smart phone. Whereby the snap check software itself is owned by the debit card issuing bank, the ability to have access to this feature without a personal account at the bank is due to the procedures of the system. This feature eliminates the need for the customer to stand in long lines at check cashing locations to cash a check and pay the associated fee. With CellFunds, there is a flat fee to use the snap check procedure. Check cashing locations usually charge a percentage fee to cash checks. Customers are no longer subject to having to engage in cashing checks during normal business hours. Now, checks can be deposited 24 hours per day, 7 days a week from the comfort of anywhere in about 1 minute.
4. The cost for the above features will be less than they are paying now for check cashing.

Withdrawals
1. Cash withdrawals can be executed at a merchant who partners with the system to provide this service, initiated through their smart phone.
2. The cost for this service will be similar to the cost of an ATM withdrawal.

Remittances
1. One of the characteristics of many unbanked people is their need to send money (remittances) to family and friends. This is usually accomplished by cashing checks at check cashing services, then taking that cash to a Money Service Business where they send the money to the final destination for what can be a substantial fee, usually driven by the amount of money sent. This entire process can take hours per month and cost a total of $20-$30 when also considering the cost of transportation. CellFunds provides a way to execute remittances with their smart phone, 24/7 from the comfort of anywhere, for a fraction of the fee, in about 1 minute. CellFunds customers can spend more of their valuable time with their family.
2. One of the features of the CellFunds remittance procedure allows remittances to be executed in real time, including remittances with international destinations.

Purchases
1. CellFunds customers can execute a purchase with just their smart phone. No plastic card is needed and no special technical functionality is needed on the phone. The entire purchase, apart from gathering the purchased goods is with their smart phone. The merchant customer experiences real time settlement of the transaction with lower fees. There is no cost for the consumer. Both the CellFunds Consumer customer and the CellFunds Merchant customer benefit by these features.
2. There is a positive identification feature for both the consumer and the merchant when using CellFunds for purchases. This assures that the transactions are conducted between two "known" parties.
3. One of the features of the CellFunds Purchase Procedure allows purchases to execute in real time, even for international transactions.

Donation Receivers
1. CellFunds customers can send donations with their smart phone, knowing that the Donation reaches the Receiver in real time.
2. Many donations are emotional transactions and are initiated to address an immediate need. Our customers know that the intent of their giving is accomplished through CellFunds.
3. The payer of the service will be determined by the Receiver of the donation.
4. CellFunds provides access to a Dashboard where the details of donations can be downloaded to facilitate receipt processing and to accommodate back end accounting processes.

CellFunds Wallet
1. The CellFunds Wallet allows customers to provide funds to their family members through additional CellFunds cards held in the CellFunds Wallet and managed with their smart phone. The Wallet allows the customers to distribute money with their smart phone and monitor the use of the money through their personal CellFunds website.
2. They can fund or defund the cards as they see fit.
3. There is no cost for the CellFunds Wallet

DETAILED DESCRIPTION OF THE PREFERRED EMBODIMENTS

Figure 1:
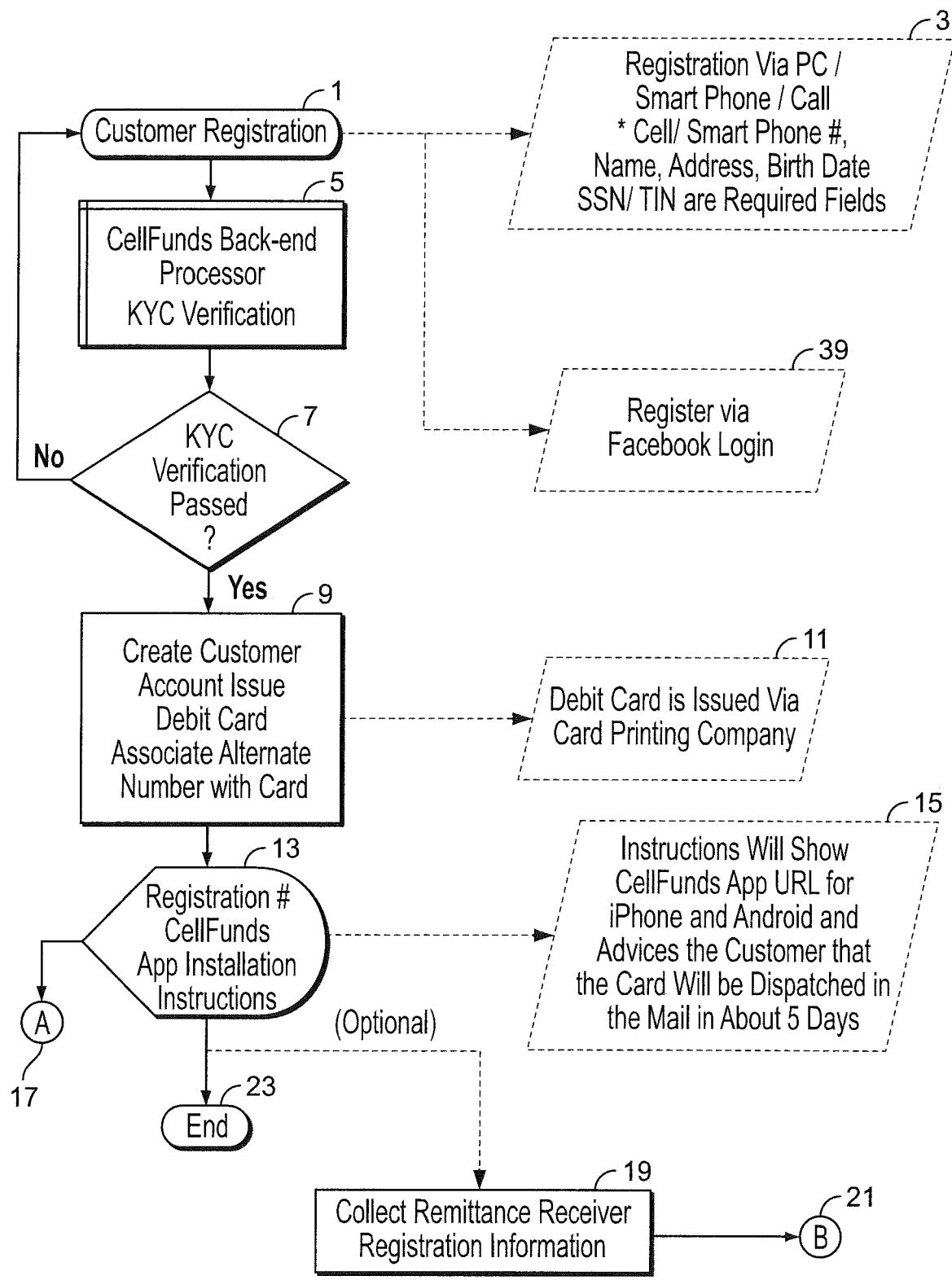
FIG. 1 is a flowchart illustrating a CellFunds Consumer customer Registration process flow.

The invention relates to a system and method that provides a way for unbanked people to participate in commerce as though they had a bank account. An unbanked person is one who does not have a bank account. The unbanked person cannot walk into a bank and make a cash deposit or use debit card technology to make purchases, either online or in person. The invention allows these types of consumers to make deposits at credit unions, make deposits at merchants, withdraw cash from merchants, send money to other people, including using a wallet feature that allows organizing this task, make donations to charitable organizations, making a purchase from a merchant using funds from the system. Hereinbelow, the system of the invention is sometimes noted by CFUSA in the drawings for space saving purposes. In following description below, "APP" is intended to mean "Application". Also the inventive system and method as herein discussed, are designated as "CellFunds" in association with the particular component or steps of the invention. Also, it is to be understood that cash deposits also include checks.

Features of the invention include the following:

CellFunds Unique Core Functionality

No personal bank account is required to have CellFunds cash management tools. Money is held in a FDIC insured pooled account for each individual customer.

The CellFunds features of service that are listed below are initiated and executed via the CellFunds Customer's smart phone through the CellFunds Consumer App, and in the case of transactions with merchants, also through the CellFunds Merchant App. Purchasing and cash withdrawal is also available through the use of the customers MasterCard or Visa branded CellFunds debit card.

CellFunds transactions are settled in real time, with funds available for Receivers of money in real time.

The system has designed a process that allows smart phone initiated CellFunds transactions to occur between two CellFunds customers supported by two issuing banks and two back end processors, in real time.

CellFunds Features of Service Utilizing the Unique Core Functionality Above

CellFunds Consumer Customer Registration—

A potential CellFunds consumer customer (see below for merchant customers) registers for a CellFunds Account that is linked to the customer by their cell phone number. Registration occurs via downloading one of the CellFunds Consumer Apps, via www.cellfunds.com, or via CFUSA partner landing page on their website.

CellFunds Merchant Customer Registration—

A potential CellFunds merchant customer (merchant) registers for a CellFunds merchant Account that is linked to the merchant by their cell phone number. Registration occurs via downloading the CellFunds merchant App or via a system website, e.g. www.cellfunds.com.

Cash Deposit at Credit Union Transaction Flow—

Cash Deposits through Credit Unions in the Credit Union Shared Services network, with no personal account required at the credit union. Right now, no one can walk into a credit union and make a deposit on their own behalf unless they have an account.

Cash Deposit at Merchant Transaction Flow—

Smart phone initiated and supported procedure for depositing cash into a customer's CellFunds account through CellFunds merchants, with real time funds availability and without a personal bank account. There are no known procedures that allow an unbanked person to make a cash deposit, without a plastic card, with real time funds availability, without a bank account. The use of the customer's smart phone allows this to occur.

Withdraw Cash Via Merchant Transaction Flow—

Smart phone initiated and supported procedure for withdrawing cash from the customer's CellFunds account through a CellFunds Merchant without the use of an ATM machine, which requires a plastic card. There are no facilities to execute this type of transaction for an unbanked person unless they executed a "cash back" request while making a purchase at a merchant. This procedure is a non-purchase event and occurs due to using a smart phone to initiate the transaction. No personal bank account is required to support this transaction.

CellFunds Customer Send Money Transaction Flow—

Procedure for sending money from one CellFunds Consumer customer to another CellFunds Consumer customer (remittances), in real time, executed via the sender's smart phone with notification received by the Receiver's smart phone and processed by CellFunds Systems in the background. Neither customer requires a bank account. The money is available for the Receiver in real time. The Receiver can access the money via their debit card, and engage in any of the features available to the sender. Both are full customers of CellFunds. There are banks that have a similar service, but it requires both customers to be banked customers, usually at the same bank.

CellFunds Consumer Customer Purchase Transaction Flow—

Procedure for a CellFunds Consumer customer making a purchase from a CellFunds Merchant executed with a smart phone (not using the debit card) and supported by CellFunds Systems processing in the background. The merchant experiences real time settlement. The merchant does not need a bank account to execute the transaction and have access to their money. They would need a business bank account as their regular operating account. The consumer does not need a personal bank account. This is a cardless and cashless transaction. That is not available today for an unbanked person.

CellFunds Donation Receiver Transaction Flow—

Procedure allowing CellFunds customers to send donations to a CellFunds "Donations Receiver" (Merchant) customer, with funding to the Receiver in real time, using their smart phone, with back end procedures accessible via a personal dashboard that support accounting requirements for those who receive donations. A personal bank account is not required for the sender nor is a bank account required for Donation Receiver to have access to their money, though they would need a business bank account as their regular operating account.

CellFunds Customer Managed Wallet Transaction Flow—

Procedures supporting the functionality of the CellFunds Digital Wallet (Wallet), allowing a CellFunds customer to manage multiple cards inside their single account through their smart phone and the CellFunds App. Transferred funds between cards and the wallet are available real time The following figures and description define various embodiments of the invention.\

A CellFunds customer Registration process flow is illustrated in FIG. 1. In FIG. 1, a potential CellFunds consumer customer (see below for merchant customers) initially registers for a CellFunds account that is linked to the customer by their cell phone number. Customer registration (1) occurs by the customer first registering with a CellFunds system website, e.g., www.cellfunds.com or by downloading one of the CellFunds Consumer Apps. Website registration can be done via a PC, via their smart phone or by calling the CellFunds Customer Service.

The required information (3) gathered from the customer includes: name, address, birth date, social security number or tax id number and cell phone number (required for CellFunds only). Optional information includes email ID and an uploaded picture of the customer. This information may also be downloaded from Facebook, with missing information supplied manually.

The above required information (3) is gathered by CellFunds Systems and passed to a back end processor (5) via API codes where conventional "Know Your Customer" (KYC) verification is applied as known in the art. The completed verification takes a matter of seconds When KYC verification (5) is passed (7) ("YES"), the customer is approved for an account and CellFunds System is advised of the approval.

Next, a customer account is created in step (9). Here, a customer is identified by their cell phone number in the CellFunds system. The customer is issued a debit card (11) that is sent to them by the card issuer in a matter of days. The debit card number is retained by a back end processor. The debit card number is identified by separate number which is linked to the phone number in the CellFunds system.

The CellFunds system advises the customer that their account is active and advises the customer to download the CellFunds App from the appropriate app store. The CellFunds System advises the customer of their CellFunds App registration number (13) and installation instructions (15) for downloading in the step (27), which is described in process flow following node A (17) as illustrated in FIG. 1A Referring back to FIG. 1, the downloading a CellFunds registration process starting at node A (17) of FIG. 1 is now described.

Figure 1A:
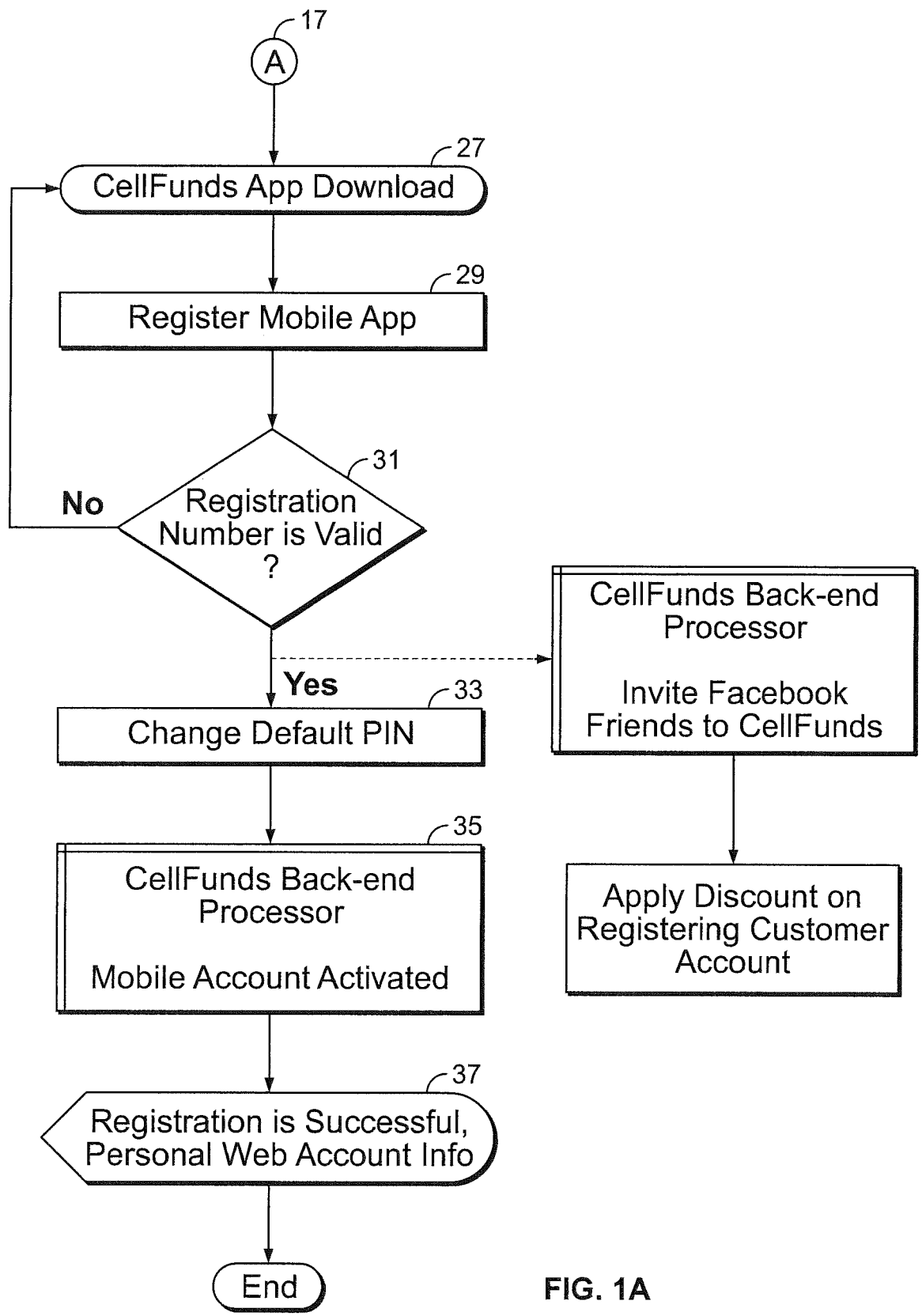
FIG. 1A is a flowchart further illustrating customer registration steps which follow node "A" of FIG. 1

Referring now to FIG. 1A, the customer first downloads the app CellFunds App in (27). The customer then opens the application to register the mobile app in (29) and enters cell phone number, application registration number previously supplied (see (13) of FIG. 1). The customer then enters a 4 digit choice for an application security code which will be subsequently required to open the application. If the Registration number provided by the customer in is valid (31), ("YES"), the customer in (33) will be prompted to change their default transaction PIN from 9999 to a 4 digit code of their choosing. At this point, CellFunds backend processor stores the customer's PIN and then customer's CellFunds application is activated in (35).

The customer is then advised that the registration is successful (37) and that they will receive their CellFunds debit card in the mail in about 5 days. The customer is also advised that they have access to a system personal website, e.g. www.cellfunds.com, where they can view their account history and manage their account by navigating to the website and to select the personal website tab.

Referring back to FIG. 1, the CellFunds system asks the new CellFunds customer to supply registration information for a potential remittance Receiver. Supplying registration information for a potential emittance, receiver (19) assures that the new customer can take full advantage of remittance functionality, which is one of the main reasons unbanked people will switch to CellFunds.

Figure 1B:
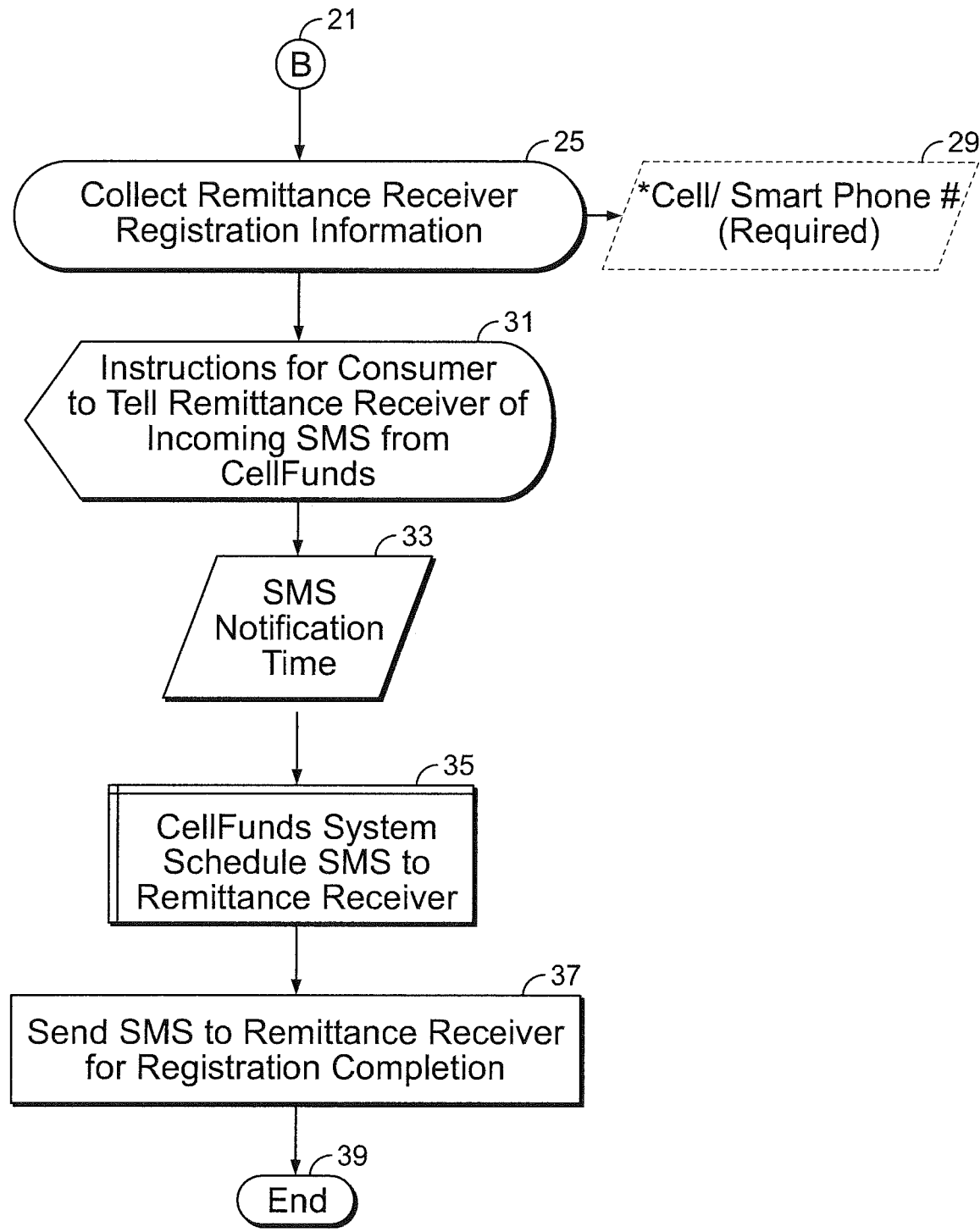
FIG. 1B is a flowchart illustrating remittance Receiver registration which follow node "B" of FIG. 1.

FIG. 1B illustrates the process flow to register customer with a remittance Receiver. This process starts at node B (21) following remittance information collection step (19) in FIG. 1.

Referring to FIG. 1B, starting at node B (21), registration information for a potential remittance Receiver (25) requires a cell/smart phone number (29). However, additional registration information is desired, but not required.

Next in block 31 of FIG. 1B, the CellFunds system requests that the new customer reach out to the potential remittance Receiver and advise them that they are a new CellFunds customer and that the remittance Receiver will receive a SMS (text message) from the CellFunds system to collect their registration information (25). The CellFunds system will ask the new customer to identify a notification time (33) when the CellFunds system should send the message to the remittance Receiver.

The CellFunds system will then schedule an SMS to the remittance Receiver as shown in (35), according the notification time designated in (33). Then a text (SMS) message (37) is sent to the remittance Receiver (37), advising them that the new customer has identified them as a remittance Receiver, asking the remittance Receiver to supply the rest of their registration information. The process to complete the registration for the remittance Receiver (37) is the same as the process for any other new customer.

Figure 2:
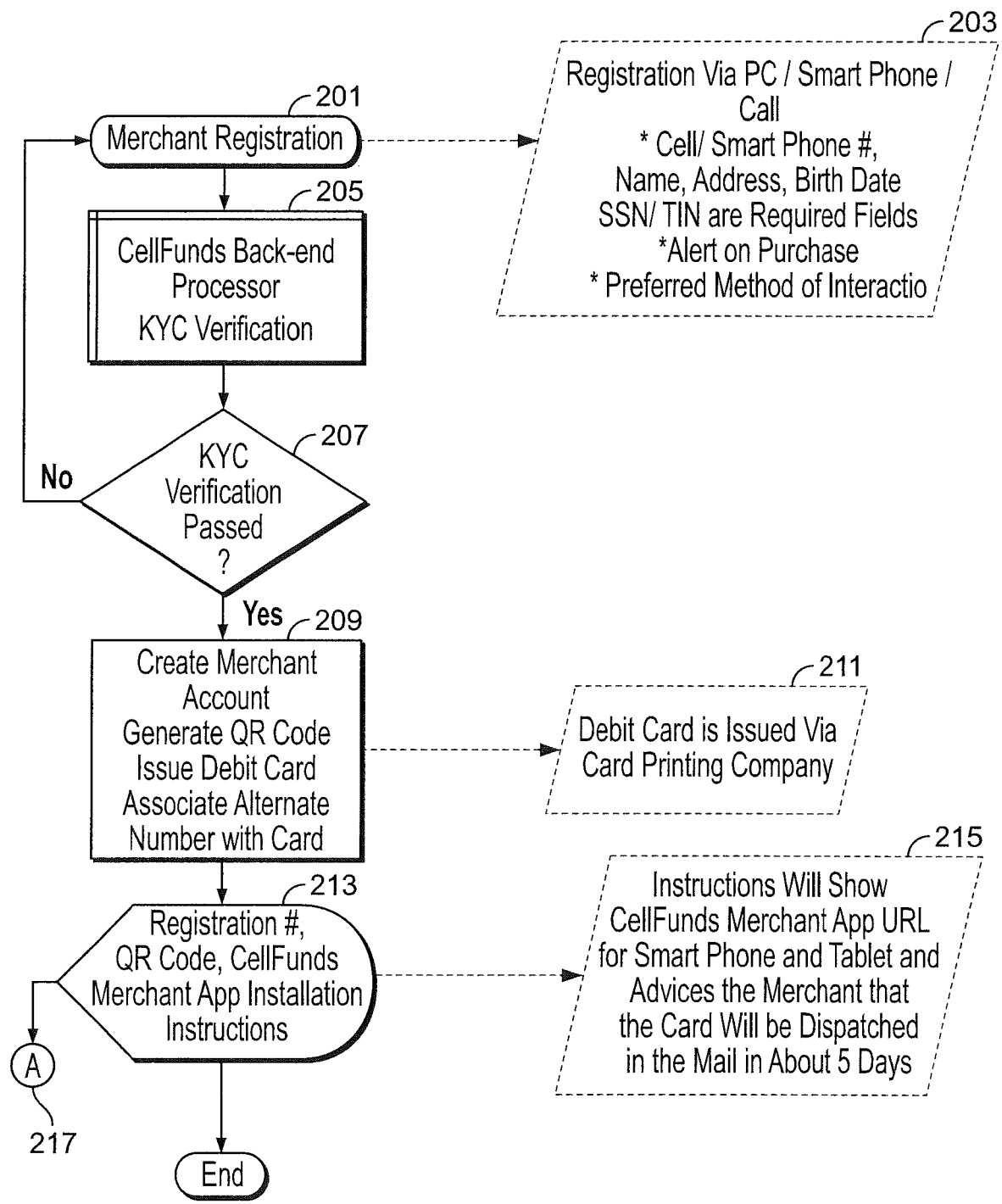
FIG. 2 is a flowchart illustrating a CellFunds Merchant customer registration process flow.

FIG. 2 illustrates the CellFunds Merchant Customer Registration process. Referring to FIG. 2, a potential CellFunds Merchant customer registers (201) for a CellFunds Merchant account that is linked to the merchant customer by their cell phone number.

The merchant customer registers with CellFunds by downloading the CellFunds Merchant App from the system website. Website registration can be done via a PC, via their smart phone or by calling the website customer service. The following required information (203) is gathered from the merchant customer name, address, birth date, social security number or tax id number, cell phone number (required for CellFunds only). Optional fields include Email ID (required for CellFunds only).

Next the merchant customer will be prompted in the downloaded merchant App to select "YES" for CellFunds Merchant (required for CellFunds only) and to select "YES" if desiring a confirmation of account balance at the end of every purchase transaction by the CellFunds consumer customer. This can be updated at any time via the merchant dashboard (required for CellFunds only). Also, the Merchant customer will be prompted to select the preferred method of interacting with CellFunds (i.e. via smart phone, tablet or PC). This can be updated at any time via the merchant dashboard (required for CellFunds only). The above required information (203) is gathered by the CellFunds systems and passed to a back end processor via API codes where conventional "Know Your Customer" (KYC) verification is applied. The completed verification takes a matter of seconds. When KYC verification (207) is passed, the customer is approved for an account and the CellFunds system is advised of the approval.

The merchant customer is then identified by their cell phone number in the CellFunds system. Still referring to FIG. 2, the merchant customer account is created (209) and the merchant customer is issued a debit number and card (211) that is sent to them by the card issuer in a matter of days. This debit card number is retained by the back end processor. The debit card is identified by an alternate number and that number is linked to the phone number in CellFunds Systems. A QR Code is also generated in CellFunds systems The CellFunds system advises the merchant customer that their account is active. CellFunds System advises the Merchant customer to download the CellFunds merchant App from the appropriate App store.

The CellFunds system advises the merchant customer of their Merchant App registration number (213). Also, as shown in (213), the merchant receives a CellFunds merchant number and a QR code for displaying to the CellFunds customer. In addition, instructions (215) will show CellFund's merchant App URL for smartphone and tablet, and notifies the merchant that the card will be dispatched in the mail a matter of days.

Figure 2A:
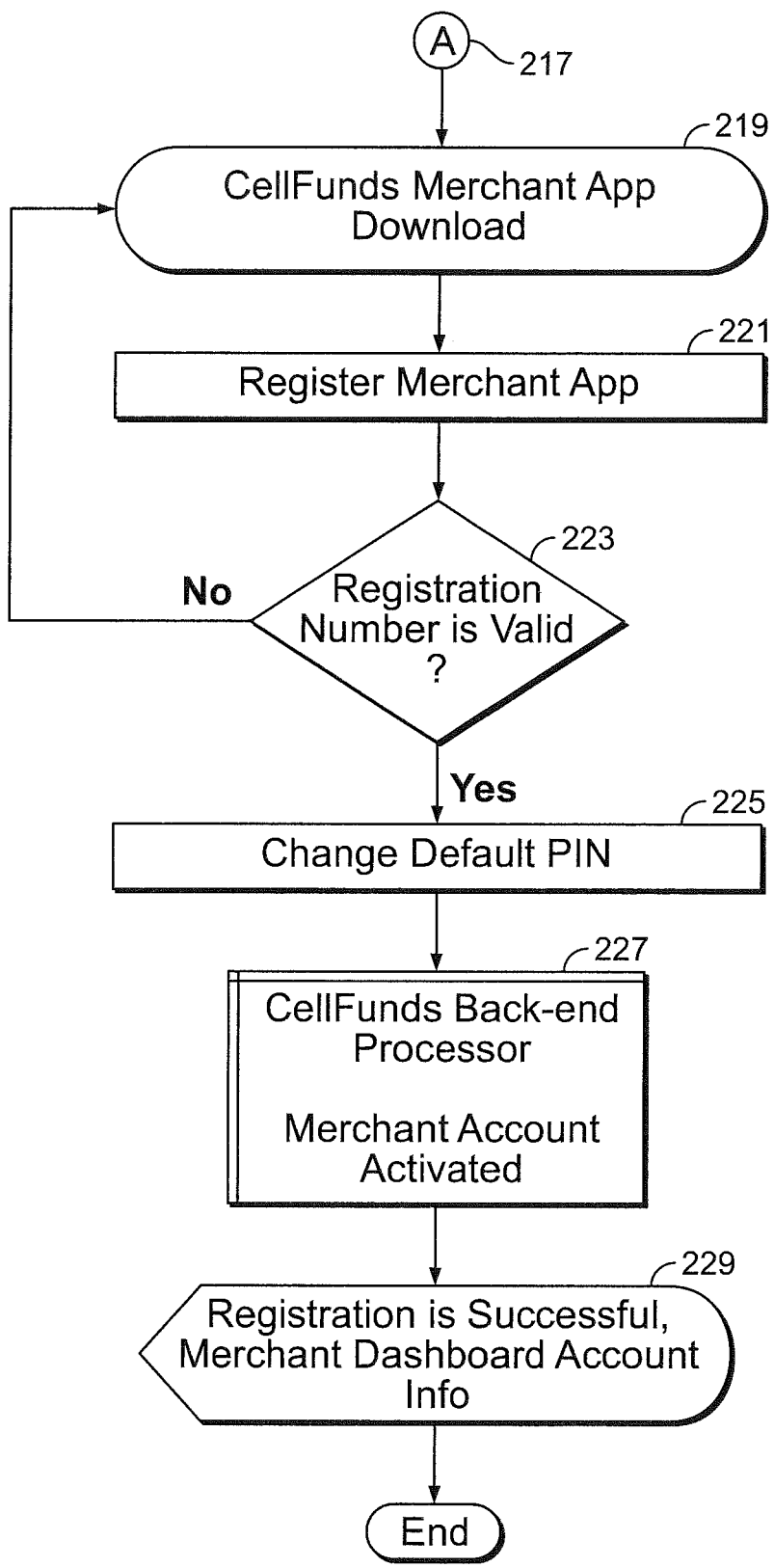
FIG. 2A, illustrates the process flow for the Merchant customer to download and register the Merchant CellFunds App.

Next, the process of FIG. 2 continues from node A (217) into node A (217) of FIG. 2A, where merchant then downloads and opens the CellFunds Merchant App (219 and registers the Merchant App (221). The customer then enters cell/smart phone number, app registration code provided (213) (FIG. 1), above and a 4 digit choice for an application security number which will be subsequently required to open the application. If the registration number supplied by the customer in (221) is valid (223), the Merchant customer in (225) will be prompted to change their default transaction PIN from 9999 to a 4 digit code of their choosing. At this point, CellFunds backend processor stores the merchant customer's PIN.

The Merchant customer's CellFunds application is then activated (227), registration having been successful, including merchant dashboard account information. (229).

The merchant customer is then advised that they will receive their CellFunds debit card in the mail in about 5 days. The merchant is advised that they have access to a merchant dashboard at the system website where account history can be viewed and management of the account can occur.

Figure 3:
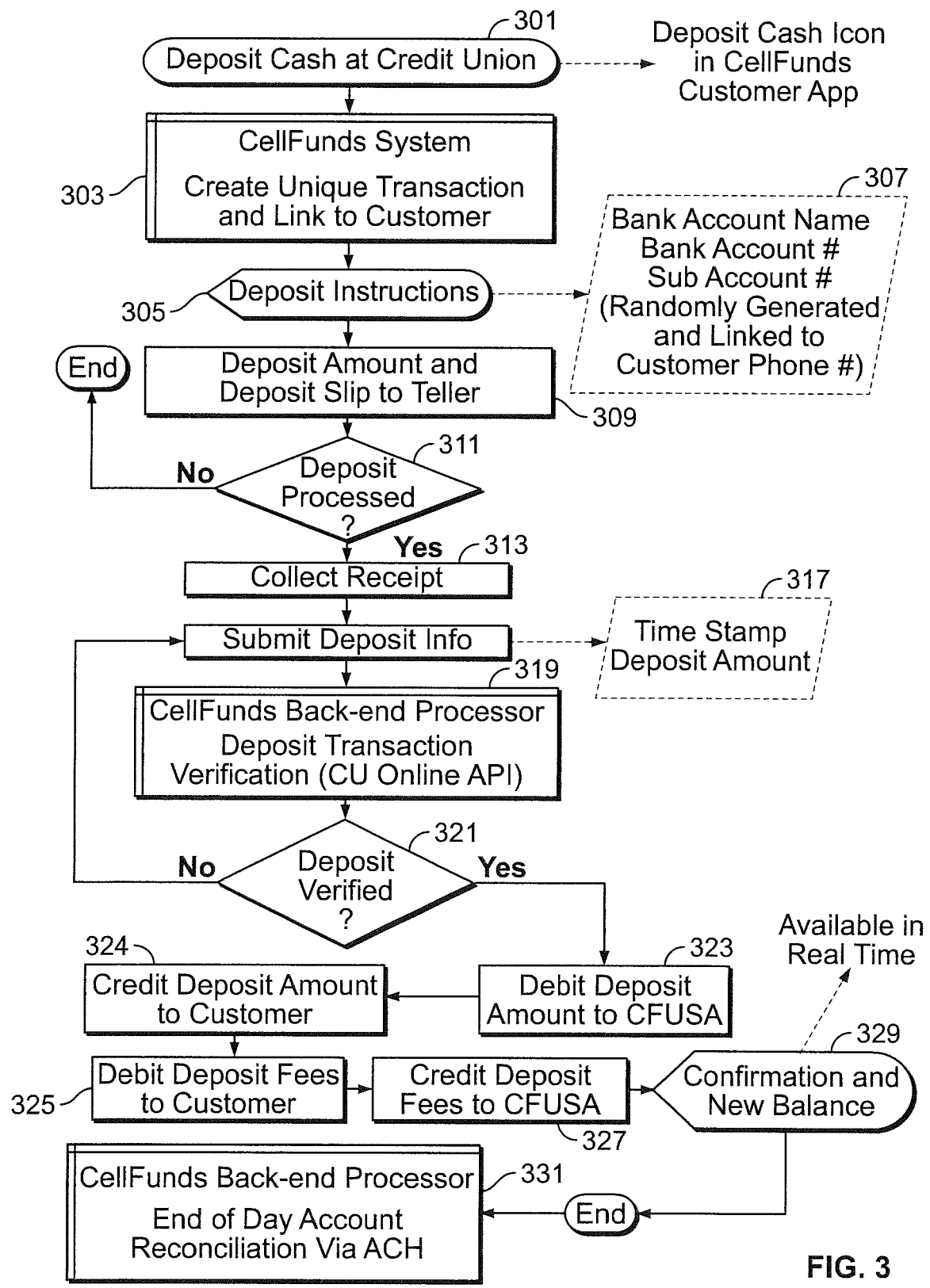
FIG. 3 is a flowchart illustrating a Cash Deposit at Credit Union Transaction process flow.

The mode of depositing funds at a Credit Union is illustrated in FIG. 3. A compelling feature of the invention is that deposits can be made through Credit Unions in the Credit Union Shared Services network, without requiring any personal account at the credit union. This is a welcome improvement over conventional banking since currently, no one can walk into a credit union and make a deposit on their own behalf unless they have an account with the credit union.

Check deposits can also be made utilizing the "snap check" feature available via their CellFunds App. Although, the snap check software itself is owned by the debit card issuing bank, the ability to have access to this feature without a personal account at the bank is provided by the inventive mobile banking system. The "snap check" feature eliminates the need for the customer to stand in long lines at check cashing locations to cash a check and pay the associated fee.

In operation, as shown by the process flow in FIG. 3, the CellFunds customer selects Deposit/Deposit Cash/Credit Union (301) from the CellFunds Mobile App.

The CellFunds system returns deposit instructions (305) to the customer for filling out a deposit slip with bank account name, bank account number and sub account number. The customer provides the amount. A sub account number is randomly generated (307) and linked to the CellFunds customer's cell phone number that when combined with the time stamp creates a unique deposit transaction that can be stored for future reference.

The customer hands the cash and deposit slip to the teller and the teller processes the deposit (309). The teller gives the customer a receipt (313). The customer replies to a prompt from CellFunds Systems via their cell phone with the time stamp and the amount of the deposit (317) from the deposit ticket. The CellFunds system confirms the deposit (321) against the credit union's online line banking system in seconds. When confirmed, CellFunds System advises the issuing bank through the back end processing system (319) that the deposit has been made and via API codes, issues a credit entry for the customer for the deposit amount (324) and enters a corresponding debit entry (325) against the system's funding account. This establishes a new balance for the CellFunds customer. CellFunds System returns a confirmation of deposit to the customer with the customer's new account balance received (329) from the issuing bank.

The money is available immediately to the customer because the amount of the deposit is funded through the system's funding account that is held by the issuing bank. Reference to CFUSA, at (323) (Debit Deposit amount to CFUSA) and (327) (Credit Deposit Fees to CFUSA) in the FIG. 3, should be interpreted as referring to the CellFunds system.

At the end of the day, money that was deposited into the credit union's system's account throughout the day is swept into a consolidating account and is forwarded to the issuing bank via an ACH transfer (331). This replenishes the system's funding account balance that was drawn from to give the customer immediate credit for the deposit.

This entire transaction can be viewed by the CellFunds customer through their personal website available at system website.

Figure 4:
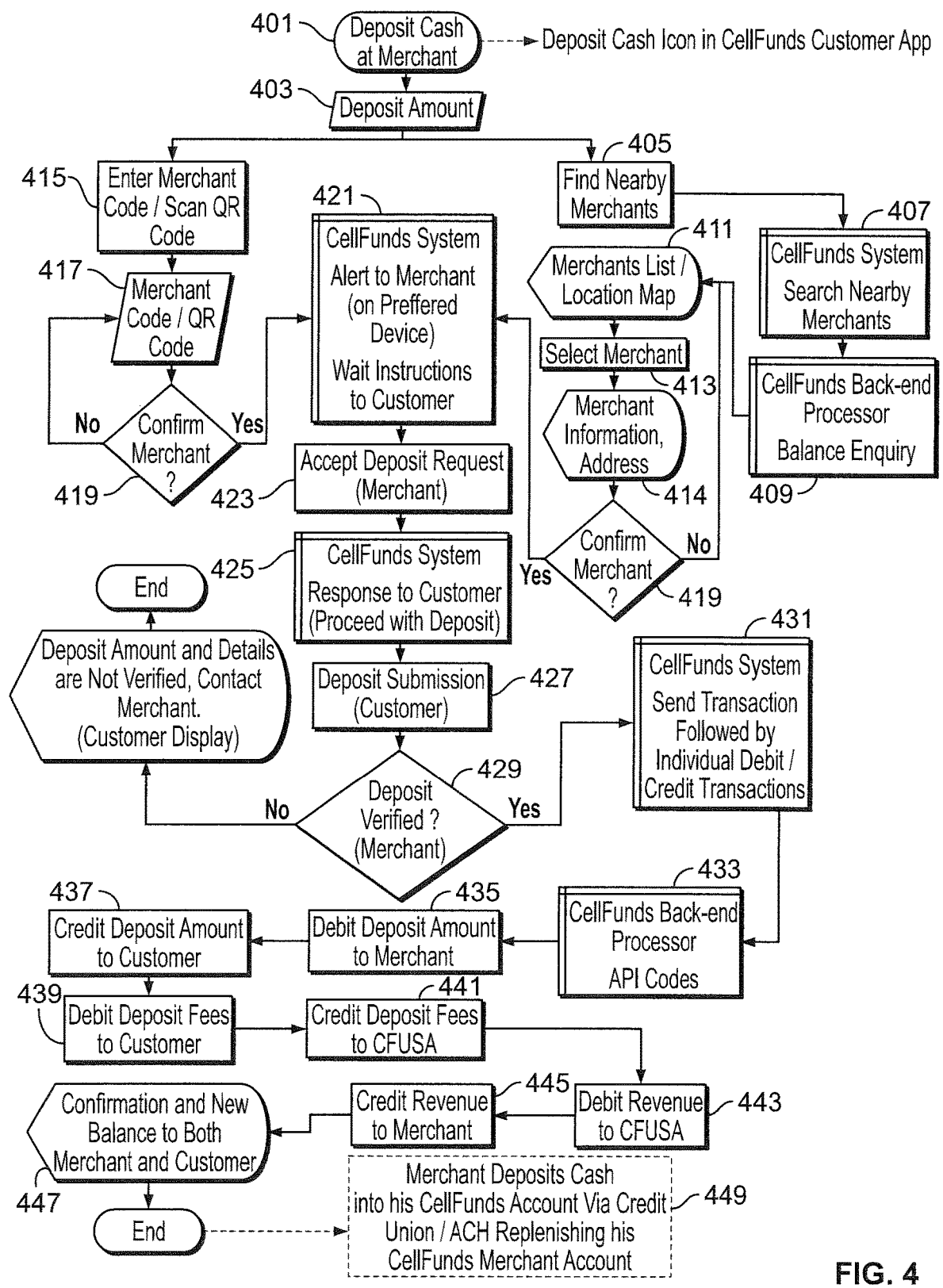
FIG. 4 is a flowchart illustrating a Cash Deposit at Merchant Transaction Flow process flow.

The mode of cash deposit at a merchant is illustrated in FIG. 4. Utilizing this process flow, cash deposits can be made at a merchant who partners with the system to provide this service, all through their smart phone. Cash is immediately accessible by the customer.

FIG. 4 depicts a smart phone initiated and supported procedure for depositing cash into a customer's CellFunds account through CellFunds merchants, with real time funds availability. There are currently no conventional way that would allow an unbanked person to make a cash deposit, without a plastic card, with real time funds availability, without even a bank account. The use of the customer's smart phone allows this to occur through the invention.

First, the CellFunds customer selects "Deposit/Deposit Cash/Merchant" from the CellFunds Consumer App (401). The CellFunds system sends a message to the customer asking for the deposit amount (403). The customer replies to the CellFunds system with the deposit amount (i.e. $200).

Next, the CellFunds system attempts to finds nearby merchants (405). The CellFunds system uses the customer's current location identified through their smart phone by conventional technology including GPS, then searches for merchants (407) where the deposit (i.e. $200) can be made. The CellFunds system sends an API code to a back end processor checking the balances for the merchants (409) that are in the area of the customer, confirming that the merchants in the area have the required funds in their CellFunds account to process the deposit.

Next, the verified list of merchant s (411) is provided to the customer for him/her to choose the one they want to use via their smart phone. The customer can switch from a list to a map of merchant locations to aid in his selection.

The customer selects the merchant (413) he/she wants to use and the merchant's name and address (414) is returned to the customer via their smart phone.

Alternatively, if the customer already knows the location of the nearby merchant, they can enter the merchant's location and enter either the merchant code (415) that is on display or scans the QR code (415) to advise that he is in the merchant location via his smart phone.

The CellFunds system returns the merchant s name and address (417) for the customer to confirm his location (419) with their PIN.

The CellFunds system then sends a message to the merchant (421) with the name and picture of the customer who wants to make a deposit and displays it on the merchant's smart phone, tablet or PC (depending on the merchant's choices during his set up process).

The merchant acknowledges that the customer is there and accepts the responsibility to execute the deposit (423) by returning his PIN.

The CellFunds system sends a message via his smart phone telling the customer to give the deposit amount (i.e. $200) to the merchant (425).

After the customer has submitted the deposit (427), the merchant responds that he has the money (429). CellFunds System then initiates a "send transaction" (431) (see sending money procedure below) sending the amount of the deposit (i.e. $200) from customer to merchant.

The CellFunds system, through an API connection to a back end processor (433), debits the merchant's account (435) and credits the customer's account (437), moving the deposit amount from the merchant to the customer.

The CellFunds system advises the merchant of the new balance and the customer of the new balance via their smart phones. The money is available to the customer real time. At this point, the merchant has the cash for the deposit and the CellFunds customer has the credit applied to his CellFunds account, which is the objective of the transaction.

The CellFunds system initiates a transaction charging the customer the amount of the deposit (for example: $2.95). A debit is charged (439) against the customer and a credit (441) for the fee is applied to the system's funding account. The CellFunds system initiates another transaction debiting the system's funding account (443) for the revenue for the merchant and crediting the merchant's CellFunds account (445). There is a transaction confirmation and new balance message sent to both the customer and the merchant at the transaction (447)

Figure 5:
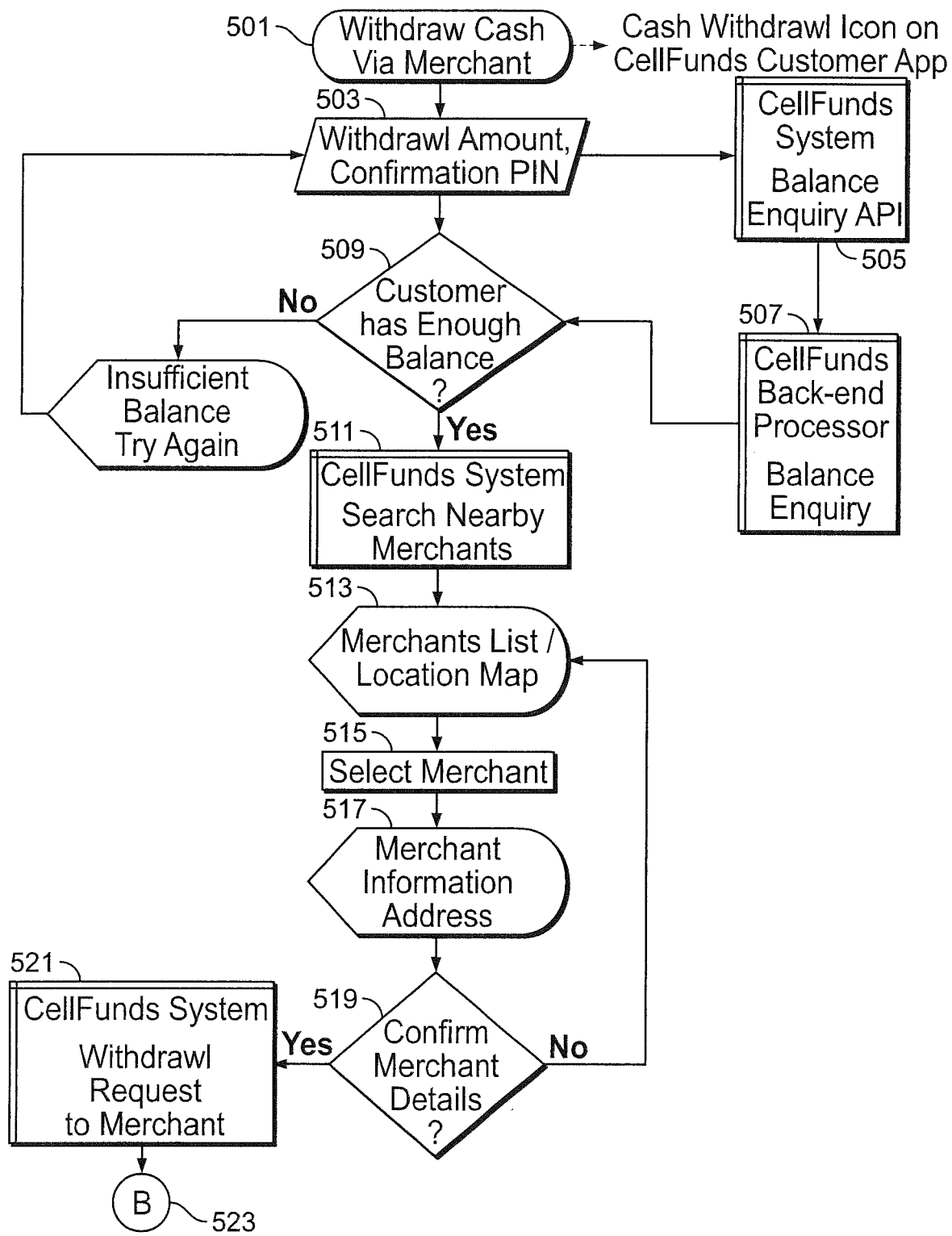
FIG. 5 is a flowchart illustrating a Withdraw Cash via Merchant Transaction Flow process flow.

At the end of the day, (449) the merchant deposits the cash the merchant has collected directly into the CellFunds merchant account using the credit union deposit procedure or deposit the money into his operating account and generate an ACH transfer into the CellFunds merchant account, to replenish his CellFunds account to facilitate deposit transactions the next day Another mode of the invention wherein cash is withdrawn from a merchant is shown in FIG. 5. This transaction supports a smart phone initiated procedure for withdrawing cash from the customer's CellFunds account through a CellFunds merchant without the use of an ATM machine, which otherwise, requires a plastic card. There are no facilities in practice to execute this type of transaction for an unbanked person unless they executed a "cash back" request while making a purchase at a merchant. This procedure is a non-purchase event and occurs by using a smart phone to initiate the transaction instead of conventional credit or debit cards, requiring a personal bank account. Importantly, this transaction flow permits an unbanked person to withdrawing cash from a CellFunds merchant since the customer is not required to have a personal bank account to support this transaction.

The mode of withdrawing cash via a merchant initiates with the CellFunds customer selecting "Withdraw Cash via Merchant" (501) on their smart phone. The CellFunds system sends a message to the customer asking for the withdrawal amount. The customer replies to CellFunds with the withdrawal amount (i.e. $200) and his PIN to confirm the request (503).

The CellFunds system then checks the balance in the customer's account through API codes (505) sent to a back end processor (507) to confirm that the customer has sufficient funds to support the withdrawal. The CellFunds system replies with the customer's balance and a message allowing or disallowing the withdrawal (509).

The CellFunds system utilizes the customer's current location and searches for merchant s (511) where the withdrawal (i.e. $200) can be made, and returns the list (513) to the customer on their smart phone.

The customer arrives at the merchant's location and selects the merchant (515) by entering either the merchant code that is on display or scans the QR code on their smart phone.

The CellFunds system returns the merchant's name and address (517) for the customer to confirm. The customer confirms the location (519) with their PIN. The CellFunds system then sends a message to the merchant on the customer's smart phone, tablet or PC, depending on the customer's preferred method to receive transactions from CellFunds, advising that the CellFunds customer is at a counter to make a withdrawal (521) and the amount.

Figure 5A:
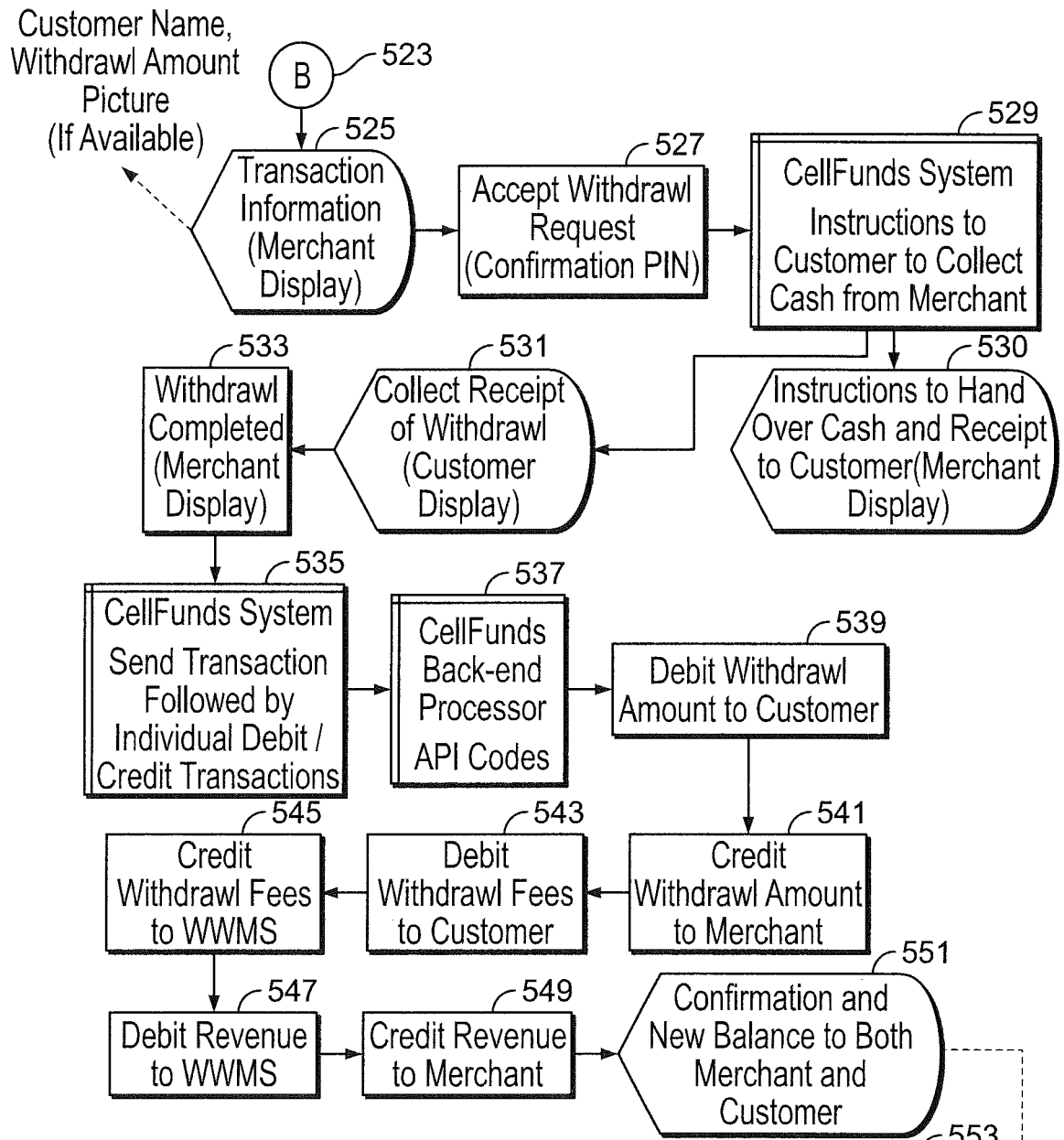
FIG. 5A is a flowchart which continues a Withdraw Cash via Merchant Transaction Flow process starting at "Diagram B" in FIG. 5.

Next, starting at the top of FIG. 5A at "Diagram B" (523), the merchant is presented with the transaction information on the merchant display (525), the merchant replies with his PIN (527) acknowledging that the merchant is ready to make the withdrawal transaction and accepts the withdrawal responsibility which requires cash in a cash drawer.

The CellFunds system sends a customer a message to collect cash from the merchant (529), and simultaneously informing the merchant to give the customer the withdrawal amount (530) (for example: $200) and a local system generated receipt to both customer and merchant, reflecting the collection by the customer (531) and withdrawal from the merchant (533). At the same time, the CellFunds system executes a "send transaction" (535), sending the amount of the withdrawal from the customer's CellFunds account (539) to the merchant's CellFunds account through the CellFunds' back-end processor (537). At this point, the CellFunds customer has the cash and is debited the withdrawal (539) and the CellFunds Merchant has the credit applied to its CellFunds account (541), which is the objective of the transaction.

The CellFunds system then initiates a transaction charging the customer the amount of the withdrawal fee (for example: $1.95). A debit is charged against the customer (543) and a credit (545) for the fee is applied to the system's funding account. The CellFunds system initiates a transaction debiting the system's funding account for the revenue for the merchant (547) and crediting the merchant's account (549).

As shown in step (551), the CellFunds system sends the withdrawing customer the new balance in their CellFunds account and sends the merchant the new balance in its CellFunds account, if set up to receive that information after each transaction.

As illustrated in block (553), at the end of the day, an ACH transfer can be initiated from his CellFunds account to the merchant's operating account to replenish a cash drawer so that withdrawals can be made the next day. Withdrawals will likely be netted against the deposit cash flow to reduce the amount of money needed to be added back to the merchant's CellFunds account to support deposits. The deposits will most likely exceed the withdrawals on a given day due to the ability of customers to use cash back when paying for purchases with their CellFunds debit card.

Figure 6:
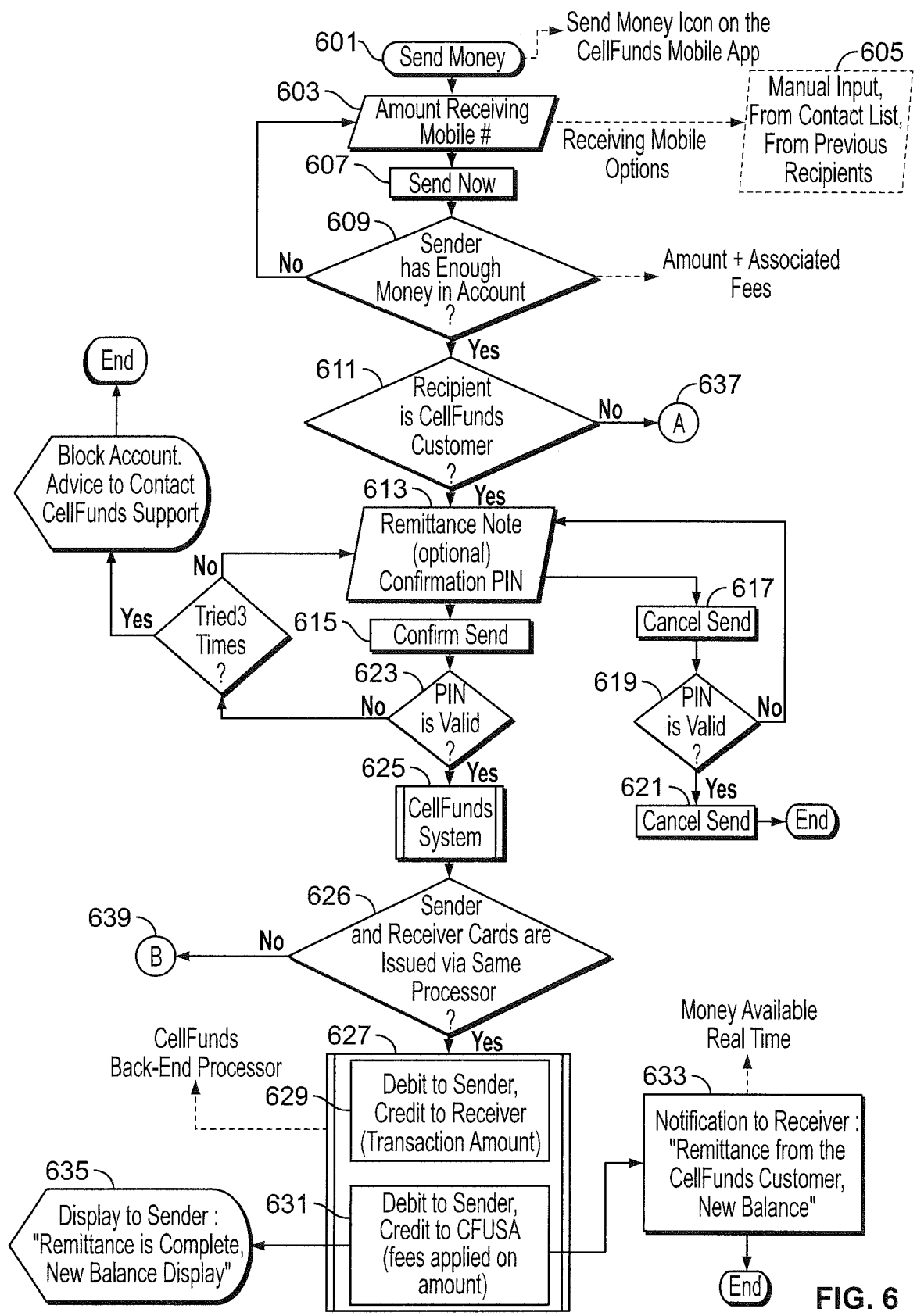
FIG. 6 is a flowchart illustrating a "CellFunds Customer Send Money Transaction Flow" process flow.

Another mode of the invention is for a CellFunds customer to send money and this mode is illustrated in FIG. 6. A procedure for sending money from one CellFunds Consumer customer to another CellFunds Consumer customer (remittances) is executed in real time, via the sender's smart phone and received by the Receiver's smart phone and processed by the CellFunds system in the background.

This process flow is advantageous for "unbanked" people who need to send money (remittances) to family and friends.

It is noteworthy that neither customer requires a bank account and that the money is available for the Receiver in real time. Each CellFunds customer can access the money via their debit card, and engage in any of the features available to the sender. There are banks that have a similar service, but it requires both customers to be banked customers, usually at the same bank.

Referring now to FIG. 6, to send money, the customer selects "Send" from the CellFunds App on their smart phone (601). Next the sending customer then enters the amount that is to be sent to the receiving CellFunds customer and then enters the receiving customer's phone number (603). The sending customer may enter the number manually, select the number from their cell phone contact list from the contact list icon, or select the number from a list of previous recipients that will appear in a drop-down list.

Next, the customer selects "Send Now" from the screen (607), where the CellFunds system confirms through the back end processor that the customer has enough money in the account to complete the transaction, including the fee for the send (609). In this case, confirmation information is provided to the CellFunds customer. If there is not enough money to complete the "Send" (609) ("NO"), the customer is advised and the transaction is cancelled.

Figure 6A:
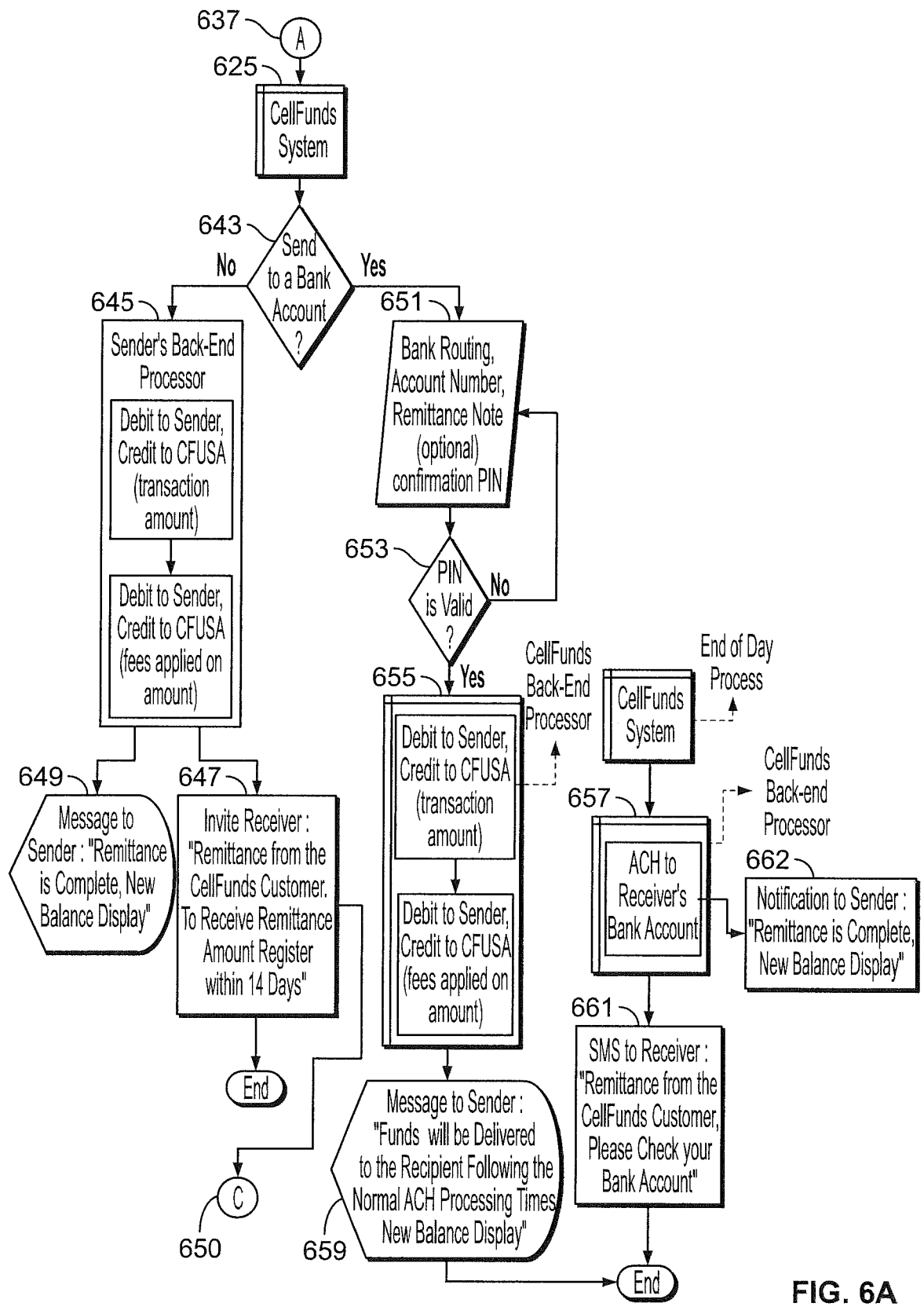
FIG. 6A illustrates the process flow continuing at node "A" of FIG. 6, where the recipient in not a CellFunds customer.

If the confirmation information provided above, states that the receiving customer is not a CellFunds customer ("NO" branch in (611)), the remittance can still be completed by two options as illustrated in FIG. 6A (Procedure 6, diagram A), which will be explained later.

Assuming that the confirmation information indicates that the recipient customer is a CellFunds customer, the sending customer receives the confirmation name and phone number of the Receiver and confirmation amount of the "send" on their smart phone. The sending customer is also provided an opportunity to enter a voice or text note that can be delivered to the Receiver with the remittance. If the confirmation is successful, the sending customer enters their PIN (613) and selects "Confirm Send" (615). If the confirmation is unsuccessful, they enter their PIN (619) and select "Cancel Send" (619) to cancel the transaction.

Figure 6B:
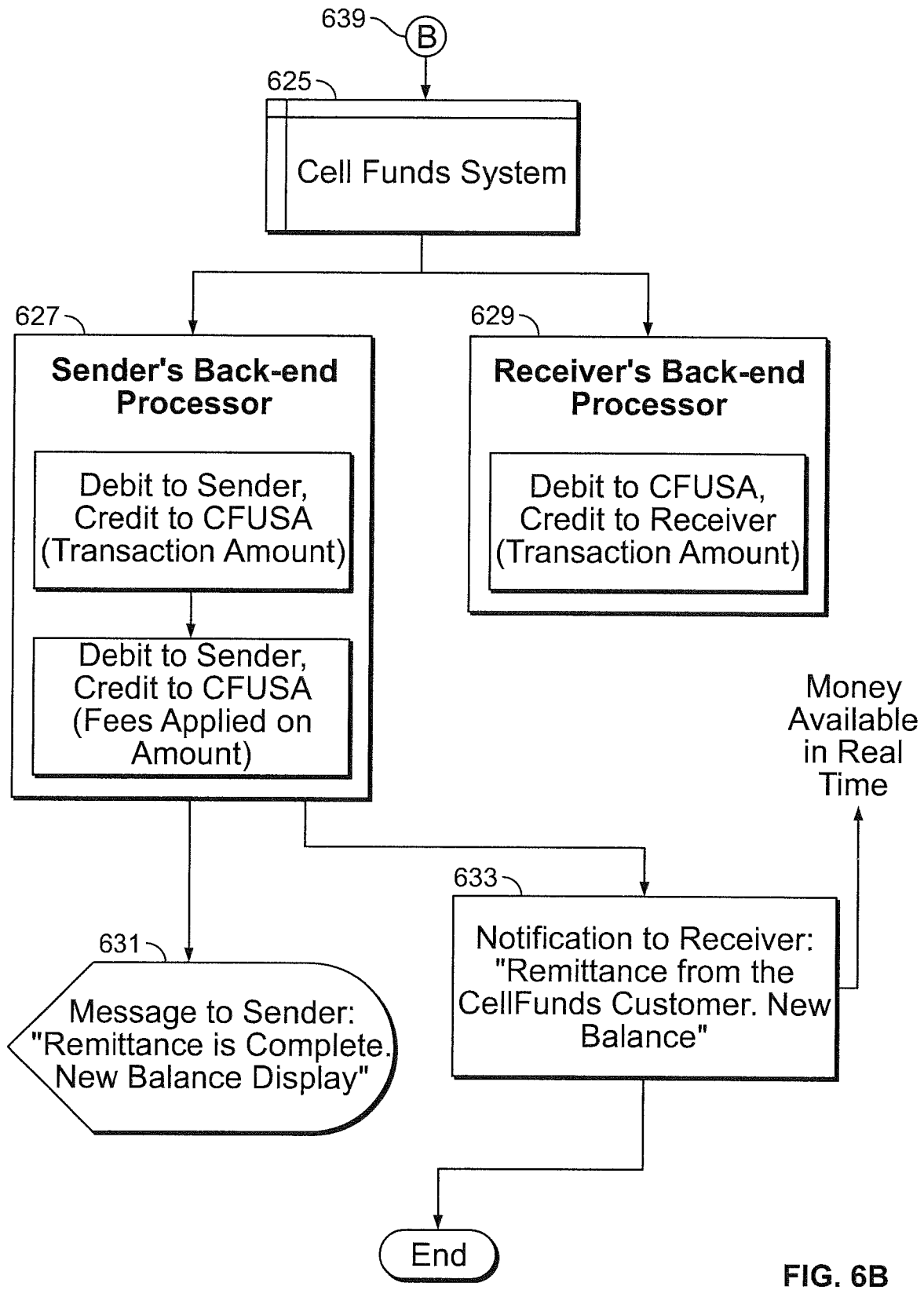
FIG. 6B illustrates the procedure when both sender and recipient are CellFunds customers and the Sender and Receiver cards are issued by different processors.

After the "Confirm Send" (615) and PIN has been entered by the sending customer, the PIN is validated by the CellFunds system (625). If the PIN is valid (623) ("YES") and the sender and Receiver cards are issued by different processors, then the process flow follows node "B" (639), in FIG. 6 to FIG. 6B (Sender and Receiver cards are issued by different processors). "Sender and Receiver cards are issued by different processors" is illustrated in FIG. 6B and will be explained later.

Assuming for the moment, that Receiver cards are issued by the same processor (626) ("YES"), the process flow continues to block (627) in FIG. 6. In this scenario, CellFunds System executes a "Send" transaction sending the amount of the remittance from the sending customer's CellFunds account to the receiving customers CellFunds account through the back end processor. CellFunds System sends API codes to the back end processor authorizing a debit to the sending CellFunds Customer's account (629) for the amount of the "Send" and a credit for the receiving CellFunds Customer's account (631) for the same amount, in real time. Notification to Receiver of the remittance from the CellFunds customer and Receiver's new CellFunds balance is posted (633). Likewise, the Sender is presented with a message indicating that the remittance is complete, with the sender's new balance (635).

In the situation where the recipient is not a CellFunds customer, as alluded to earlier, then again, the process flow continues from node "A" (637) in FIG. 6 to node "A" in FIG. 6A (637). Referring now to FIG. 6A, there are two options of sending money to a non-CellFunds customer. Option 1 (643) ("NO") involves the following steps as illustrated in FIG. 6A.

The CellFunds system withdraws the money from the customer sending the money via sender's back end processor (645) and holds it in a reserve account pending the completion of the steps taken by the receiving customer (647) (below). Sending customer receives a message to the effect that "remittance is complete", with their updated CellFund's balance displayed (649).

The receiving customer receives a message (647) from the CellFund's system via their smart phone saying that money has been sent to them from the customer. If they want to receive the money, they can register for CellFunds at the website (www.cellfunds.com) or by downloading the CellFunds Consumer App from the appropriate app store. When their registration is completed, the money that was sent to them will be credited to their account. If the registration is not completed in 14 days, the money is returned to the sending customer.

Figure 6C:
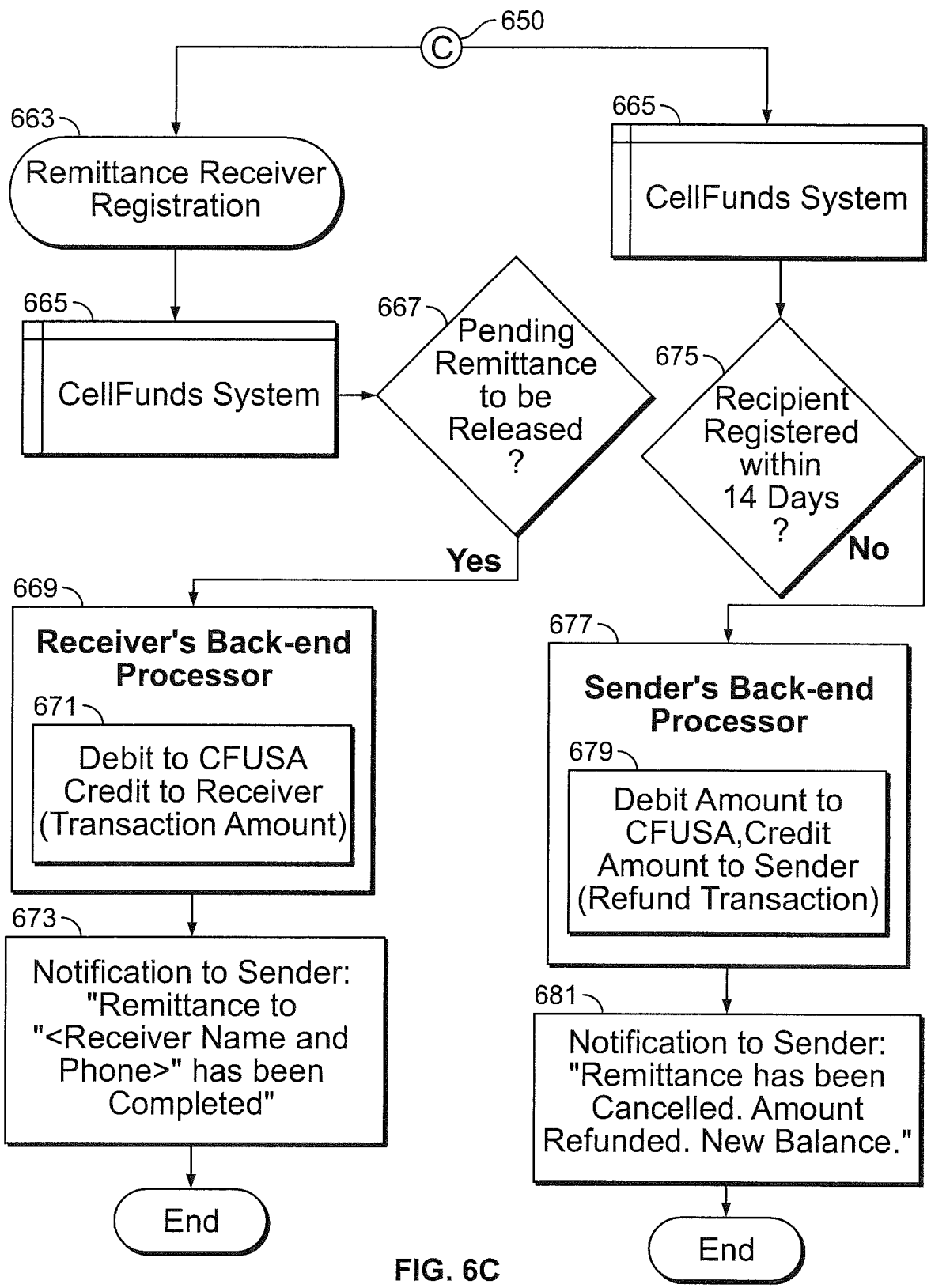
FIG. 6C illustrates the process flow for Remittance Receiver registration from "C" in FIG. 6A

Remittance Receiver registration is illustrated in FIG. 6C, starting at node "C" (650). In FIG. 6C, Remittance registration for the Receiver (663) is implemented thought the CellFunds System (665). After registration has been completed by the Receiver, the CellFunds system (665) releases the pending remittance in (667), and debits the CFUSA through Receiver's back-end processor (669), crediting the Receiver for the transaction amount (671). Notification is sent to the sender "remittance to <receiver name>,<phone> has been completed" (673).

In parallel, following the right side of FIG. 6C, the CellFunds System (665) monitors whether the recipient has registered within the 14 day deadline in order to receive remittance from the sender. After 14 days, if the recipient has not registered (675) ("NO"), then the CellFunds system, through the "Senders Back-end processor" (677), debits the amount to CFUSA, and credits amount to sender (refund transaction) (679). Notification is sent to the sender "remittance has been cancelled <amount> refunded,<new balance>." (681).

Returning back to FIG. 6A, another option for the sending CellFunds customer if the receiving customer is not a CellFunds customer, is to "Send to a Bank account" (643) ("YES"). In this instance, if the money needed to be sent immediately, it is possible to send the money to a non-CellFunds customer, but it would not be received in real time. It would be sent through the normal ACH process. Necessary entries include (651) bank routing number and, bank account. Other optional entries include a remittance note. After confirming with PIN (653), sent money is moved to a holding account (655) until the ACH is executed through the back end processor (657). Several messages (659), (661) and (662) in FIG. 6A are issued as illustrated during this process.

As mentioned earlier, FIG. 6B, which continues from node "B" (639) in FIG. 6, illustrates the procedure when both sender and recipient are CellFunds customers and the "Sender and Receiver cards are issued by different processors". Referring now to FIG. 6B, starting at node "B" (639), CellFunds System (625) executes a "Send" transaction sending the amount of the remittance from the sending customer's CellFunds account to the receiving customers CellFunds account through two back end processors, (Sender's and Receiver's processors).

CellFunds System sends API codes to the sender's back end processor (627) authorizing a debit to the sending CellFunds Customer's account for the amount of the "Send" and a credit to the system's funding account for the same amount in real time.

CellFunds System also sends API codes to the Receiver's back end processor (629) authorizing a debit to the system's funding account for the amount of the "Send" and a credit to the receiving CellFunds Customer's account for the amount of the "Send" in real time.

These two transactions, both in real time, assure that even with two issuing banks comprising two back end processors, the "Send" transaction results in real time funds for the Receiver, without a personal bank account on either side of the transaction. Messages to sender (631) and Receiver notifications (633) are provided to inform them of remittance completion and current balances.

Figure 7:
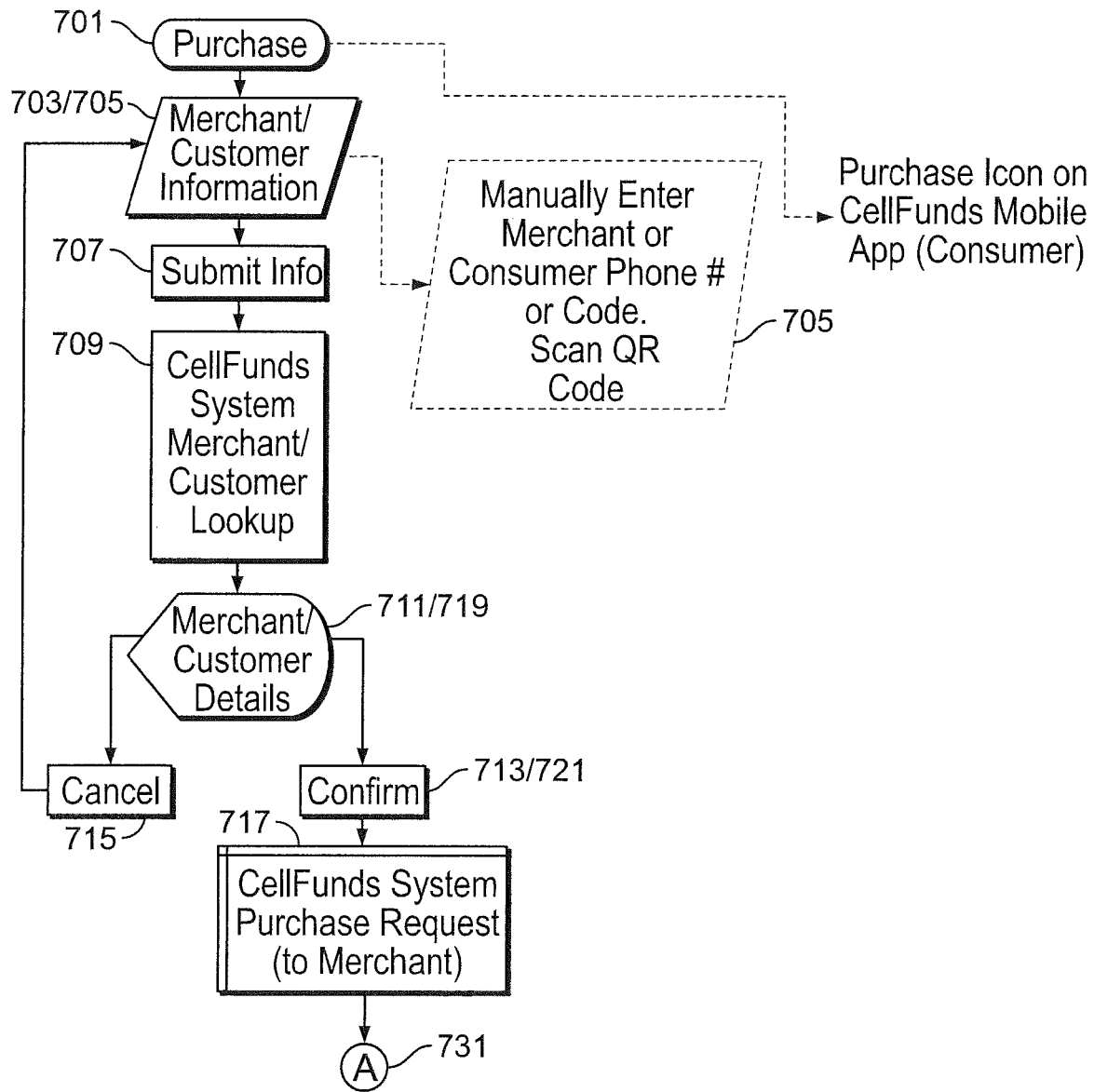
FIG. 7 is a flowchart illustrating a CellFunds Consumer Customer Purchase Transaction Flow process flow.

The credit entry to the system's funding account at the sending customer's back end processor and the debit entry to the system's funding account at the receiving back end processor balances to zero. At the end of the day, there is an ACH transaction for the net amount of the day's transactions issued to settle the funding accounts at the two issuing. Another mode of the invention relates to a CellFunds Consumer customer purchase transaction and this is illustrated in FIG. 7. This procedure for a CellFunds Consumer customer making a purchase from a CellFunds Merchant is executed with a smart phone without the need of a debit card and is supported by CellFunds system background processing. In practice, the merchant experiences real time settlement. Also, the merchant does not need a bank account to execute the transaction and have access to the consumer's money. The merchant however, would need a business bank account as their regular operating account. The consumer does not need a personal bank account, which is ideal for an unbanked person. This is a cardless and cashless transaction that is not available today for an unbanked person. There are two apps referenced in this procedure. The CellFunds system Consumer procedures and the Consumer App functionality are in regular font. To improve readability of description of this process flow, described in FIG. 7, the CellFunds Merchant procedures and the Merchant App functionality are in italics.

Referring now to FIG. 7, customer selects Purchase (701) from the CellFunds App. The customer is then connected with the merchant for the transaction. The customer inputs (707) the merchant code into the App as supplied by the merchant (705) or *customer captures the QR code of the merchant that is displayed by the merchant* (705). The customer selects "find merchant" (709).

*Alternatively, in step (705), the merchant scans the QR code of the CellFunds customer or enters the customer's cell phone number. The merchant selects Find Consumer.* CellFunds System receives the information through either path and returns the name of the merchant to the customer (711) or *the name and the picture of the customer if previously supplied by the customer, to the merchant (719.)* If the merchant name is incorrect, submit "Cancel" to cancel the transaction (715) and begin again, checking to see that the merchant code is correctly entered. If the merchant name and address is correct (711), the customer replies with their PIN to confirm the transaction (713). The CellFunds system sends the purchase request (717) to the merchant.

*If the customer information (719), returned to the merchant, is verified (by observation or by picture ID of the customer), the merchant replies with their PIN to confirm the consumer details (721). If the customer name and/or picture are incorrect, then the merchant rejects the consumer's details (723) to cancel the transaction and begin again, checking to see that the customer phone number is correct.*

Figure 7A:
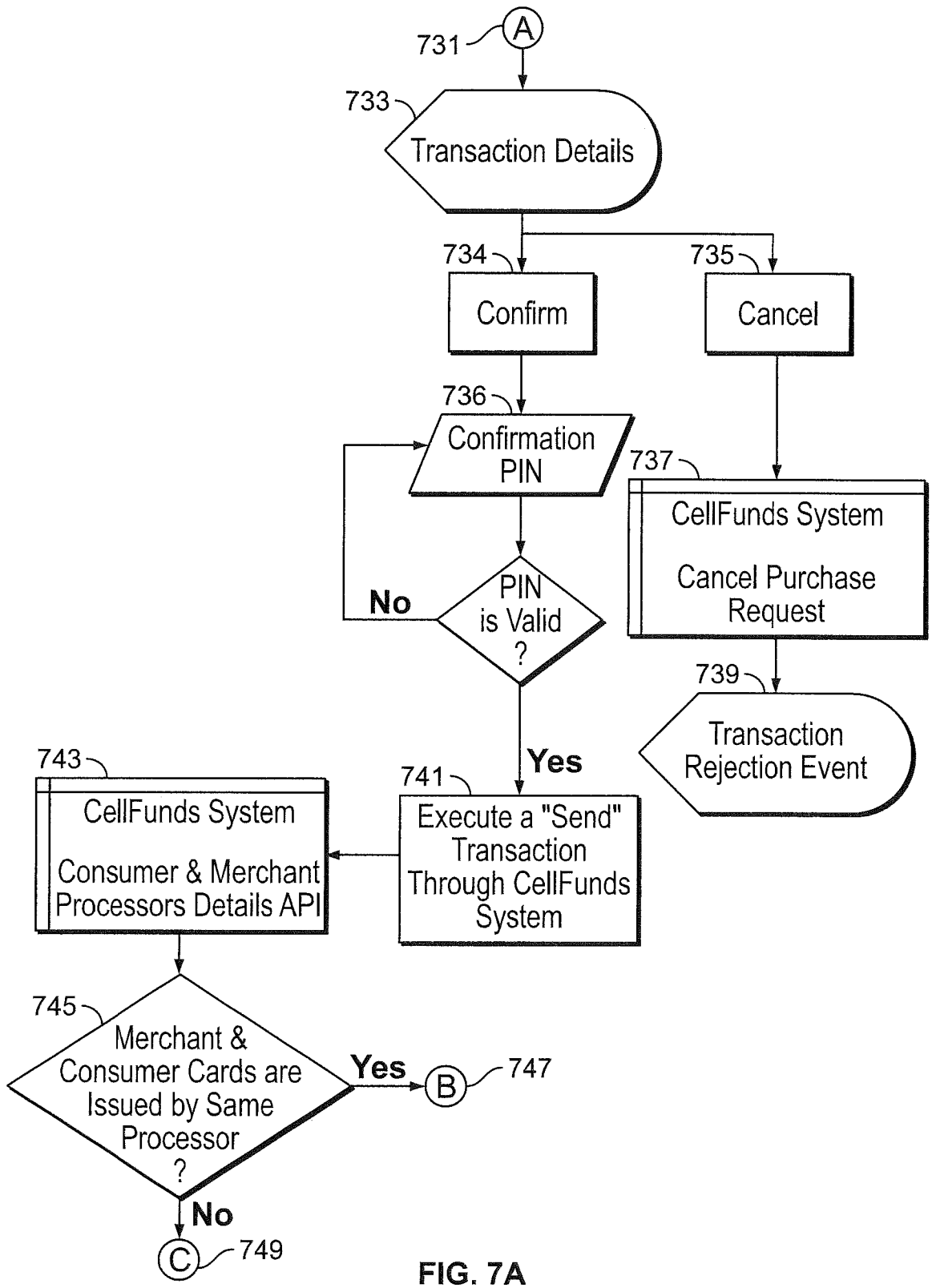
FIG. 7A continues the process flow from node "A" in FIG. 7.

*Referring to FIG. 7A, starting at node "A" (731), the CellFunds system sends the merchant a screen for entering the purchase details (733). The merchant calculates what is due from the customer and enters the amount and a transaction number, if so desired, into the purchase detail screen. The merchant then confirms the transaction with his PIN (734)).* The CellFunds system sends the CellFunds customer a screen with the details of the purchase. The customer may confirm (734) the purchase details by returning his PIN. The customer may reject the purchase details by selecting "Cancel" (735) and returning his PIN. The CellFunds system then processes "Cancel purchase request", and the transaction event is rejected (739). If the confirmation PIN entered by the customer in (736) is valid, the CellFunds system receives the confirmation and executes a CellFunds "Send" transaction (741) from the customer to the merchant for the amount of the transaction. The CellFunds system consumer and merchant processors detail API (743) then determines whether the Consumer and merchant processors are the same or different. Typically, the processors are the same for a given country, unless, for example, one bank in a given country cannot accommodate all of the CellFunds customer's money.

Figure 7B:
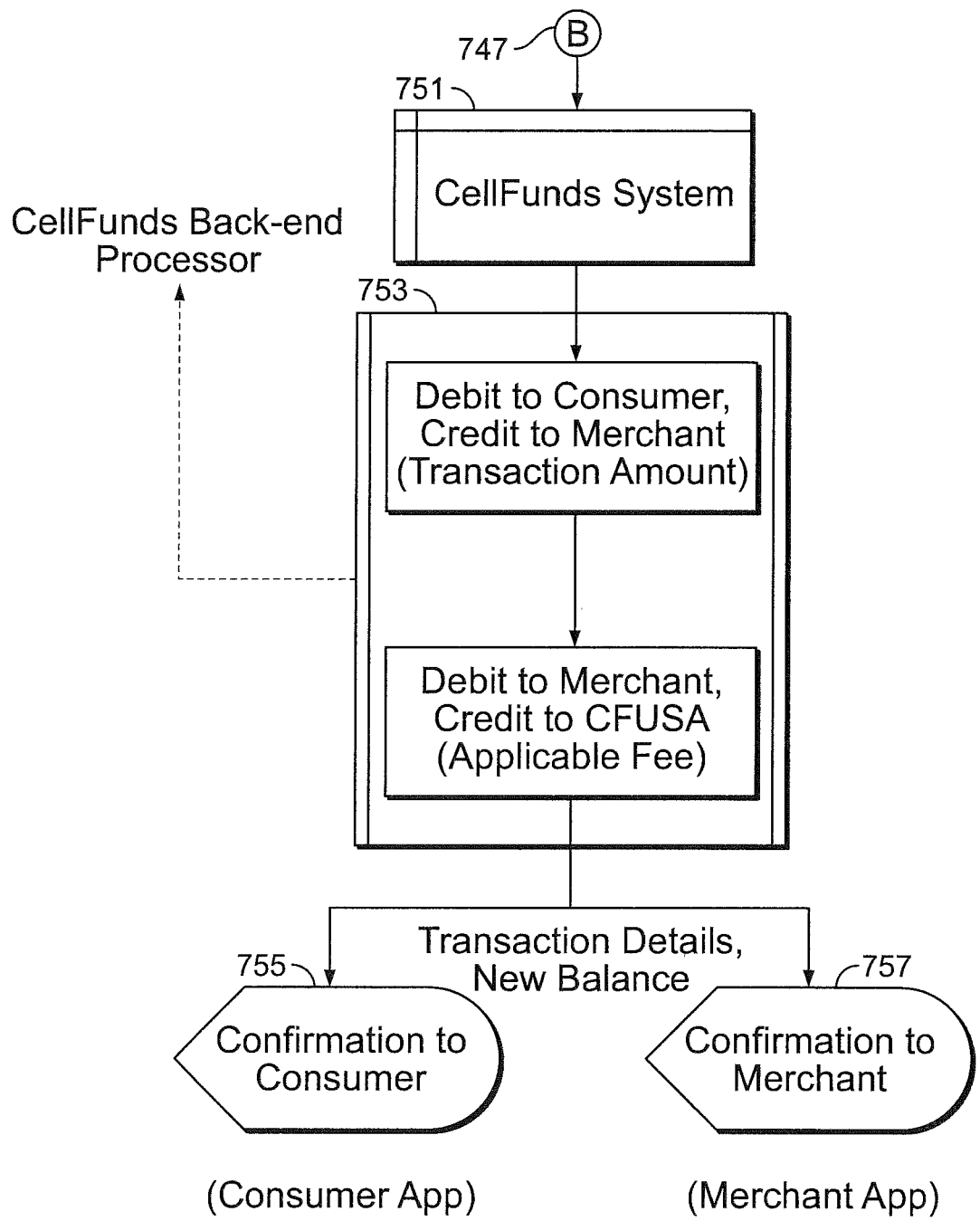
FIG. 7B continues the process flow from node "B" in FIG. 7A.

If indeed, the merchant and consumer cards are issued by the same processor in (745), the process flow continues to FIG. 7B via node "B" (747). Otherwise, if different processors are used by the customer and merchant, respectively, then the process flow continues to FIG. 7C via node "C" (749).

Assuming, for the moment, that merchant and consumer cards are issued by the same processor, then in FIG. 7B, the CellFunds System (751) sends API codes to the back end processor (753), authorizing a debit to the CellFunds customer's account for the amount of the purchase and a credit for the CellFunds merchant's account for the same amount, enabling real time settlement with lower fees. The normal merchant process requires a batch process at the end of a period of time, with the merchant receiving credit for their sales at a time in the future.

The CellFunds system sends the customer a confirmation (755) that the transaction has been completed along with the customer's new balance on his smart phone. The merchant receives a confirmation (757) via the merchant APP, that the send transaction has been completed along with the merchant's new balance (if selected "yes" during merchant set-up) via merchant's smart phone, tablet or PC.

Figure 7C:
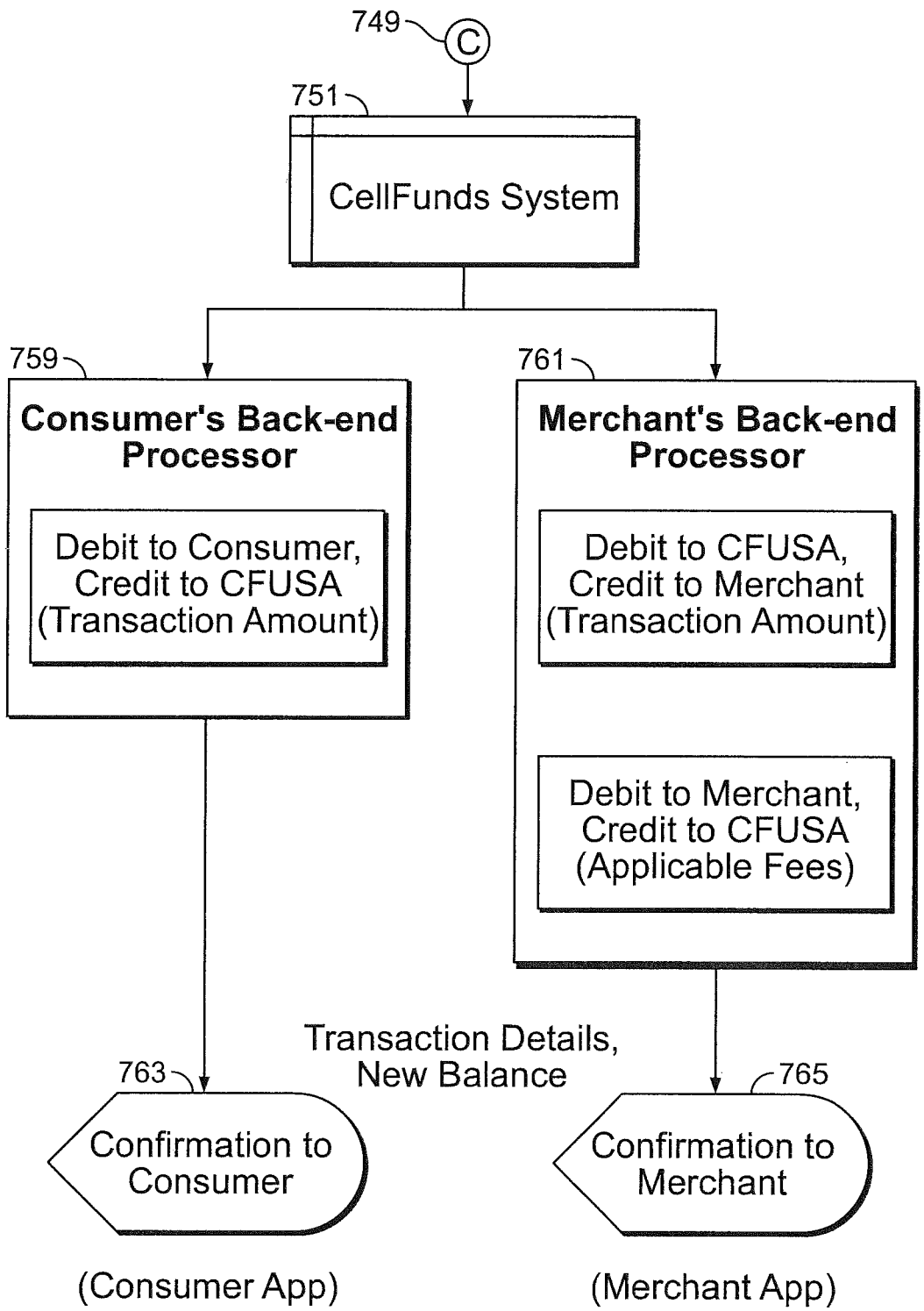
FIG. 7C continues the process flow from node "C" in FIG. 7A

Assuming instead, that the merchant and consumer cards are not issued by the same processors as mentioned above, then the process flow continues from node "C" (749) in FIG. 7A to (749) (Node "C") in FIG. 7C is as follows.

CellFunds System (751) sends API codes to the CellFunds Customer's back end processor (759) authorizing a debit to the purchasing CellFunds Customer's account for the amount of the purchase and a credit to the system's funding account for the same amount in real time.

CellFunds System sends API codes to the merchant's back end processor (761), authorizing a debit to the system's funding account for the amount of the purchase and a credit to the CellFunds Merchant's account for the amount of the purchase in real time.

Confirmation details are provided to the consumer via the consumer App (763) and also to the merchant via the merchant App (765).

It is noteworthy that these two transactions, both in real time, assure that even with two issuing banks amounting to two back end processors, the purchase transaction results in real time fund transactions for the merchant, without a personal bank account on either side of the transaction.

The credit entry to the system's funding account at the purchasing customer's back end processor and the debit entry to the system's funding account at the merchant's back end processor balances to zero.

At the end of the day, there is an ACH transaction for the net amount of the day's transactions issued to settle the funding accounts at the two issuing banks.

CellFunds System sends API codes to the back end processor and debits the merchant for the applicable fees and credits the system's funding account for the same amount.

Concluding the process flows of both FIGS. 7B (same processor) and 7C (different processors), confirmation details are provided to the consumer via the consumer App (755) and also to the merchant via the merchant App (757).

Lastly, the merchant gives the product or service and receipt to the customer. Fees associated with executing the transaction are paid by the merchant, following the normal interchange fee logic. Customers set up as CellFunds Merchants triggers the charging of fees to the merchants as opposed to levying send command fees to customers.

The history of this transaction and all transactions are available via the personal website for the consumer and via the personal dashboard for the merchant through the system website for both parties.

Another mode of the invention involve donating funds using the CellFunds system and this is illustrated in FIGS. 8A, 8B, 8C, 8D and 8E. The CellFunds Donation Receiver transaction flow permits both CellFunds customers and non CellFunds customers to send donations to a CellFunds Donations Receiver (merchant) customer, with funding to the Receiver in real time. This transaction is performed using sender's smart phone, and received via a personal dashboard (using CellFund's back end procedures) that support accounting requirements for those who receive donations. A personal bank account is not required for the sender, nor is a bank account required for Donation Receiver to have access to their money, though the Donation Receiver would need a business bank account as their regular operating account.

Figure 8:
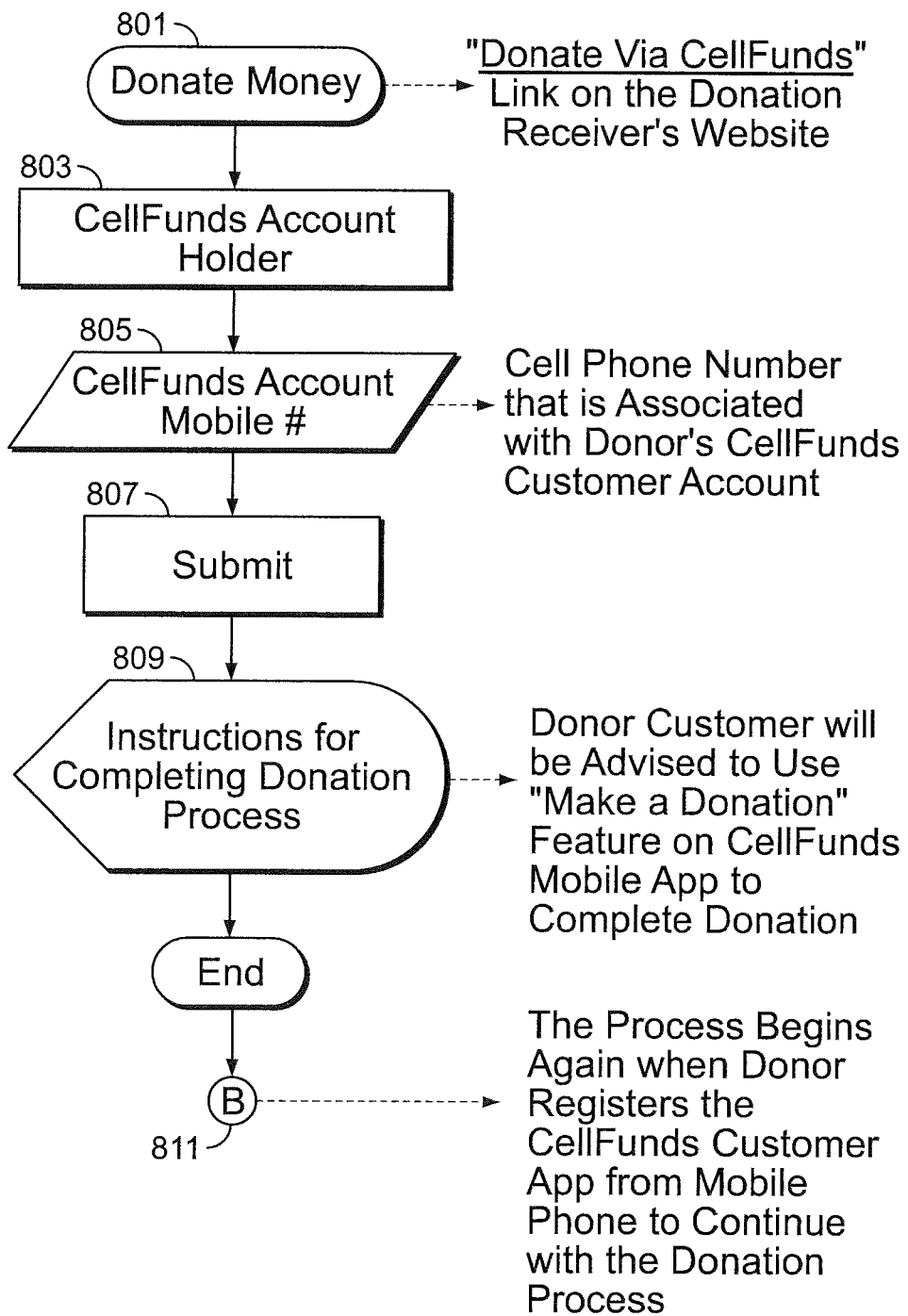
FIG. 8 is a flowchart illustrating a CellFunds Donation Receiver Transaction Flow process flow.

Referring to FIG. 8, the CellFunds customer (account holder) visits the Donation Receiver's website and selects "Donate via CellFunds" link (801). customer (803) enters their cell phone number (805) in "Enter the cell phone number associated with your CellFund's Account" and selects submit (807). The CellFunds system confirms that the donor is a CellFunds Customer. CellFunds System provides instructions (809), advising the customer to use the "Make a Donation" feature on their CellFunds mobile App to complete donation".

Figure 8A:
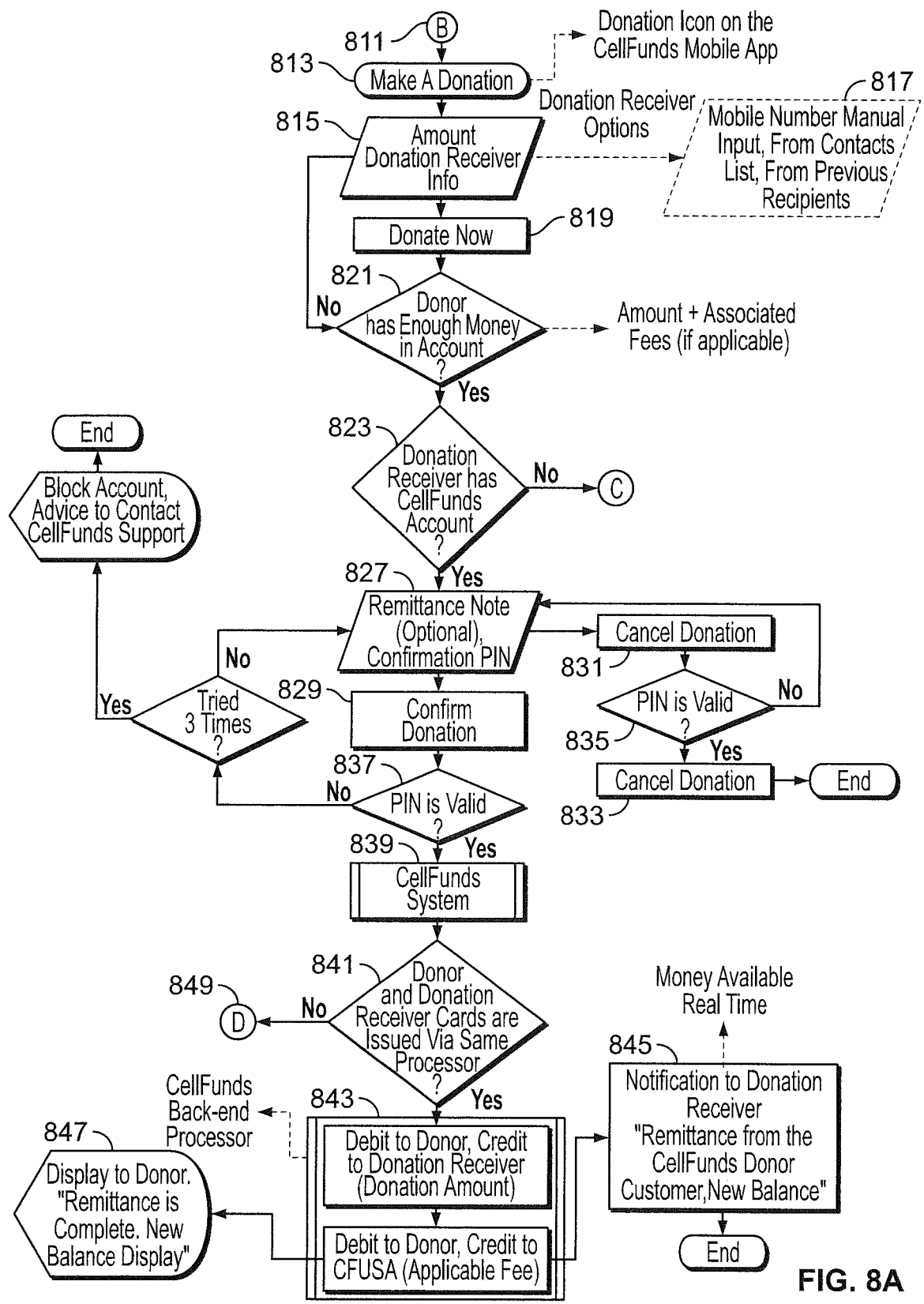
FIG. 8A is a flowchart continuing from FIG. 8 which illustrates how to make a donation.

Next, referring to FIG. 8A starting at Node "B" (811), this process continues with the CellFunds customer selecting "Make a Donation" from the CellFunds App (813) on their smart phone. The customer enters the amount (815) that is to be donated to the Donation Receiver CellFunds customer.

The customer then enters the Donation Receiver's phone number or code that is available from the Donation Receiver. The customer can do this in three ways (817): by entering the cell phone number manually, selecting the number from their cell phone contact list from the contact list icon on the CellFunds App, or they may select the number from a list of previous recipients that will appear in a drop-down list when the previous Receiver's icon is selected.

The customer selects "Donate Now" (819) from the screen.

The CellFunds system confirms through the back end processor that the customer has enough money in their account to make the donation, including the fee for the donation if applicable (821) ("YES").

If there is not enough money to make the donation (821) ("NO"), the customer is advised and the customer may change the donation amount, or select Cancel.

Assuming that the customer has enough money in the CellFunds account (821) ("YES"), then the customer receives confirmation information in (823), including confirmation name and phone number of the Donation Receiver and the amount of the donation on their smart phone.

Assuming for now, the Donation Receiver does have a CellFunds account; path (823) ("YES") is followed. A screen display provides the Donation Receiver an opportunity to enter an optional remittance note (827) that can be delivered to the donor with the donation. If their confirmation information is successful, the donor customer enters their PIN and select Confirm Donation (829).

If the confirmation information is not correct, the donor customer enters their PIN and select "Cancel Donation" (831) to cancel the donation. The donation is cancelled by the system (833) then ends when the donor customer's entered PIN is validated (835) ("YES").

Figure 8B:
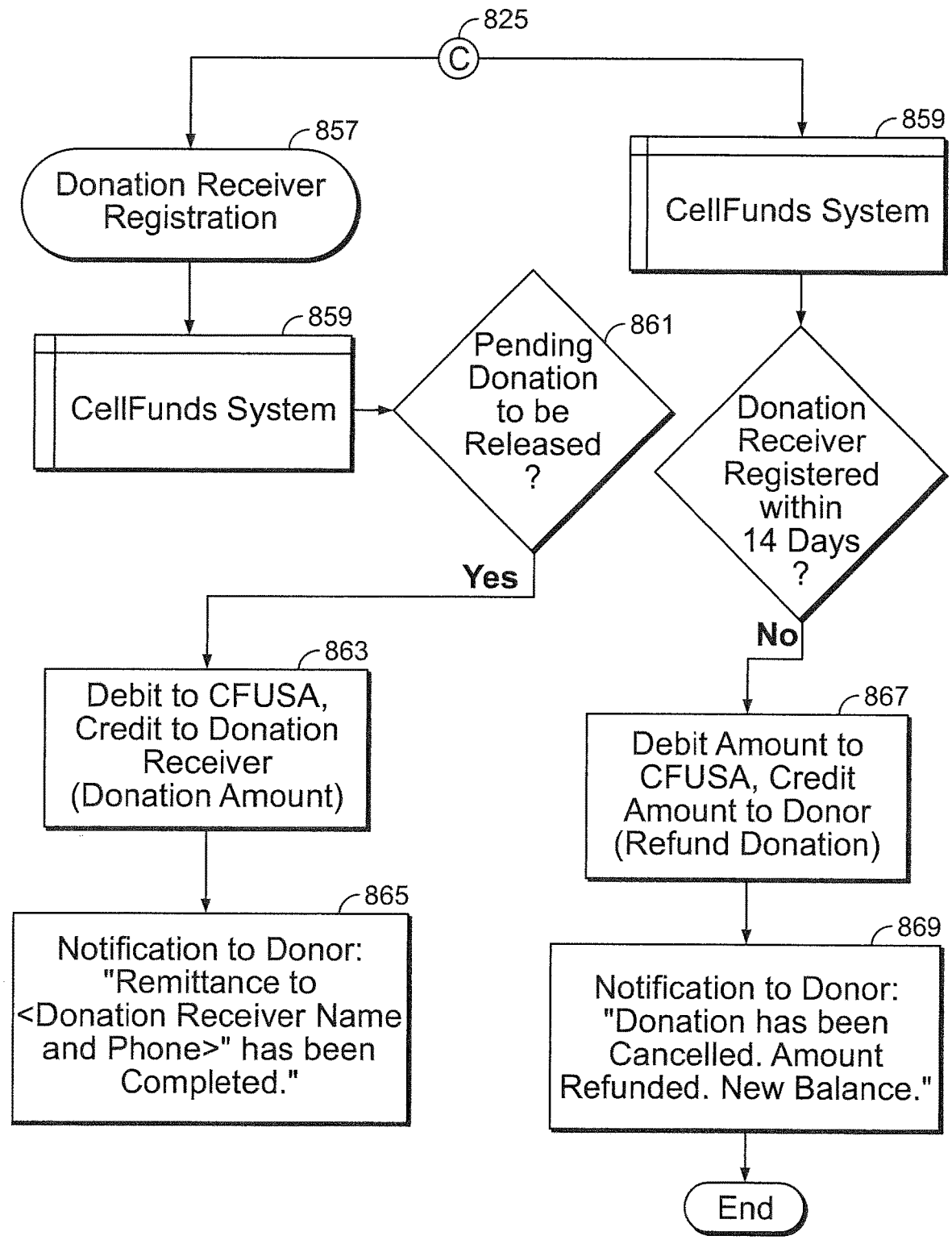
FIG. 8B is a flowchart continuing from FIG. 8A which illustrates the process flow when the Donation Receiver does not have a CellFunds account.

If the confirmation information received in (823) states that the Donation Receiver is not coded as a CellFunds Donation Receiver customer, the remittance can still be completed, by following node "C" (825) which is later explained below and which is illustrated in FIG. 8B.

The Donation Receiver customer receives a message from CellFunds System via their smart phone saying that a donation has been sent to them from the customer. If they want to receive the money, they can register for CellFunds at www.cellfunds.com.

After the registration is completed, the money that was donated to them will be credited to their account.

If the registration is not completed in 14 days, the money is returned to the sending customer.

After "confirm donation" (829) has been selected with the customer PIN validated (837) ("YES"), and the CellFunds system (839) determines that there is one back end processor involved in this transaction (841) ("YES"), CellFunds System executes a donation transaction sending the amount of the donation from the sending customer's CellFunds account to the Donation Receiver's CellFunds account through the back end processor (843).

Here, the CellFunds system sends API codes to the back end processor (843), authorizing a debit to the donating CellFunds customer's account for the amount of the donation and a credit for the Donation Receiver's CellFunds account for the same amount, in real time.

The CellFunds system returns a message to the donor (847) saying that the "remittance is complete" and returns the new balance for the donor customer on their smart phone.

At the same time, a message is sent to the Donation Receiver's smart phone (845) advising them that they have been sent a donation from the CellFunds customer. The Donation Receiver is also given a new balance and their money is available for use in real time.

In addition, the CellFunds system provides a dashboard where the Donation Receiver can retrieve donation information (name, date, amount, donation details) of the donors in a file to facilitate back end accounting work, such as issuing receipts to donors.

Fees associated with executing the transaction are paid by the Donation Receiver if they have made that selection during their set up process.

The history of this transaction and all transactions are available via the personal websites through www.cellfunds.com for both parties.

Figure 8C:
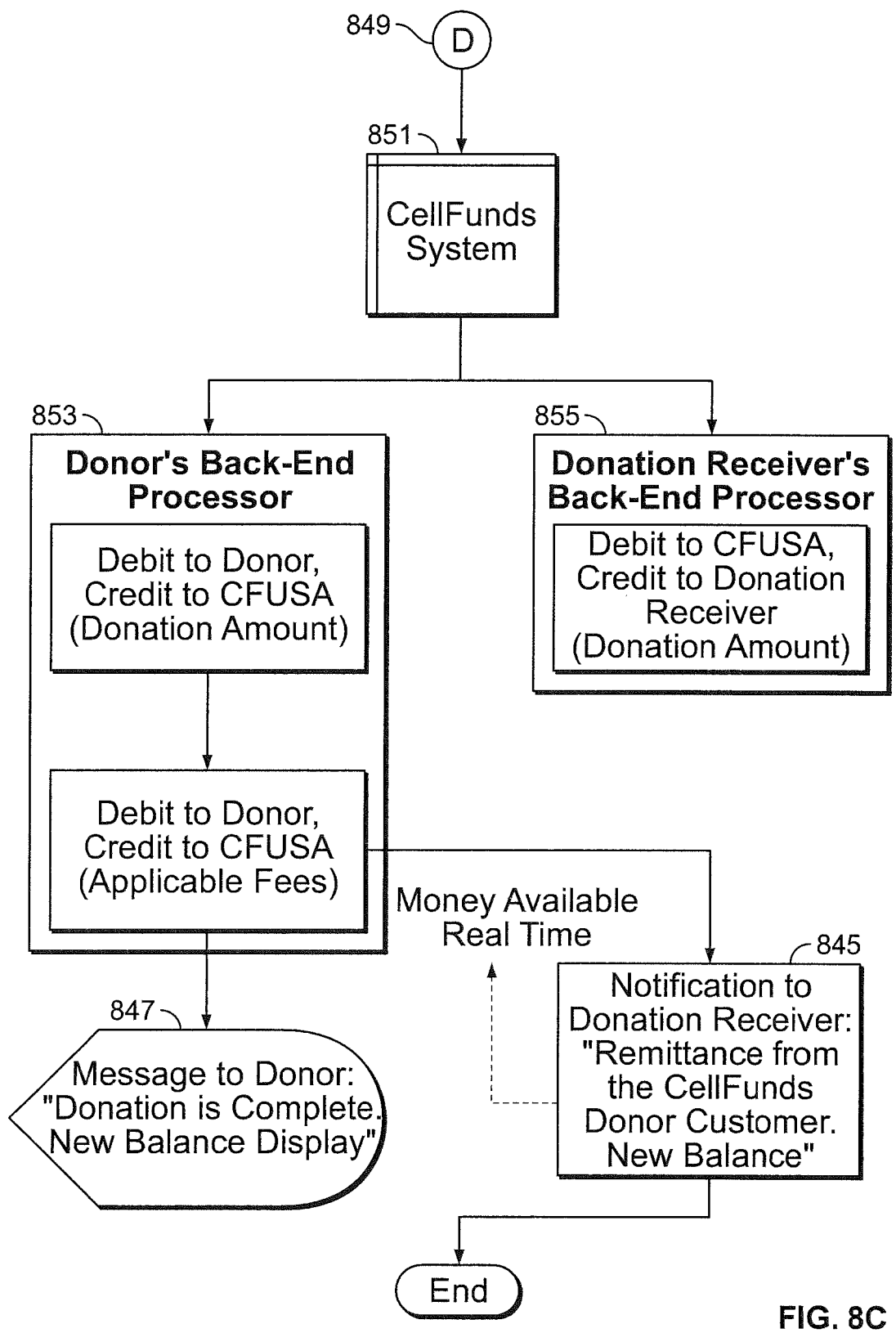
FIG. 8C is a flowchart continuing from FIG. 8B at node "D" which illustrates the process flow when the donor and Donation Receiver cards are not issued by the same processor.

Alternatively, if the CellFunds system (839) determines that there are two back end processors involved between donor and recipient, then path "D" (849) in FIG. 8A is followed, leading to FIG. 8C.

Following path "D" (849) (two back-end processes) and referring to FIG. 8C, The CellFunds system (851) executes a donation transaction sending the amount of the donation from the sending customer's CellFunds account, through the donor's backend processor (853) to the Donation Receiver's CellFunds account, through the Donation Receiver's back-end processor (855).

The CellFunds system returns a message to the donor (847) saying that the donation is complete and returns the new balance for the customer on their smart phone.

At the same time, a message is sent to the Donation Receiver's smart phone (845) advising them that they have been sent a donation from the CellFunds customer. They are also given their new balance. Their money is available for use in real time.

Next, referring back to FIG. 8A at decision block (823), if the Donation Receiver does not have a CellFunds account (823) ("NO"), then the process flow proceeds to FIG. 8B. If the confirmation information (823), (FIG. 8A), returned above, states that the Donation Receiver is not coded as a CellFunds Donation Receiver customer, the remittance can still be completed. The Donation Receiver must, in this case, register (857) with the CellFunds system (859). The receiving Donation Receiver customer receives a message from CellFunds System (859) via their smart phone saying that a donation has been sent to them from the customer. If they want to receive the money, they can register for CellFunds at the system website to receive the pending donation (861).

When the registration is completed (861) ("YES"), the money that was donated will be credited to the Donation Receiver's account (863) by a debit to CFUSA. Notification (865) to the donor (donation amount) is then provided informing the donor that remittance to the Donation Receiver (name/phone) has been completed.

If the registration is not completed in 14 days, the money is returned to the sending donor crediting the donor the amount debited to CFUSA (867). In this instance, notification (869) to the donor is provided: "donation has been cancelled. Amount refunded, including "new balance".

Figure 8D:
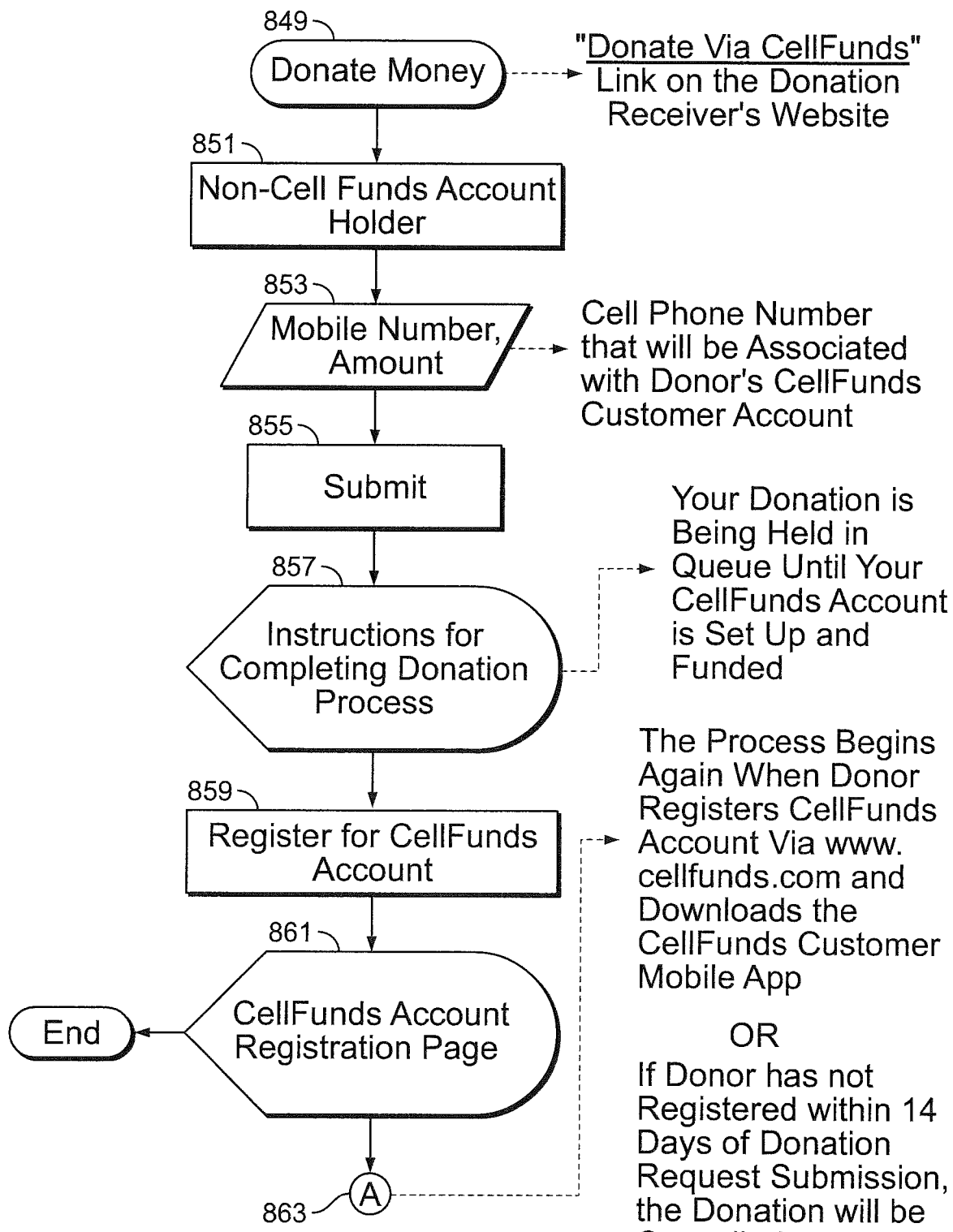
FIG. 8D illustrates the process flow for how a non-CellFunds customer can donate money to a Donation Receiver.

Referring to FIG. 8D, a non-CellFunds customer can donate money to a Donation Receiver (849) by selecting the "Donate Money via CellFunds" link on the Donation Receiver's website.

On the Donation Receiver's website, the non-CellFunds customer (851) selects "Not a CellFunds Account Holder". The CellFunds system returns a message, "You may submit a donation now. When your CellFunds Account is set up, the donation will be sent to the Donation Receiver." The customer selects "Accept" and the CellFunds system returns a screen asking for "smart phone number" and "amount of donation." (853). The donor enters the information and selects "Submit" (855).

The CellFunds system returns instructions for completing the donation process (857) and informs the non-CellFunds customer: "Your Donation is being held in queue until your CellFunds account is set up and funded." The customer selects "Register for CellFunds Account" (859) and the customer is taken to the regular CellFunds Account registration screen (861) (see FIG. 8E) referenced in customer Registration Procedure above.

The CellFunds system will send them a reminder message to establish the new account if it is not done. As soon as the account is active and funded, the donation will be released to the Receiver. If the account is not set up and funded in 14 days, the donation will expire.

Figure 8E:
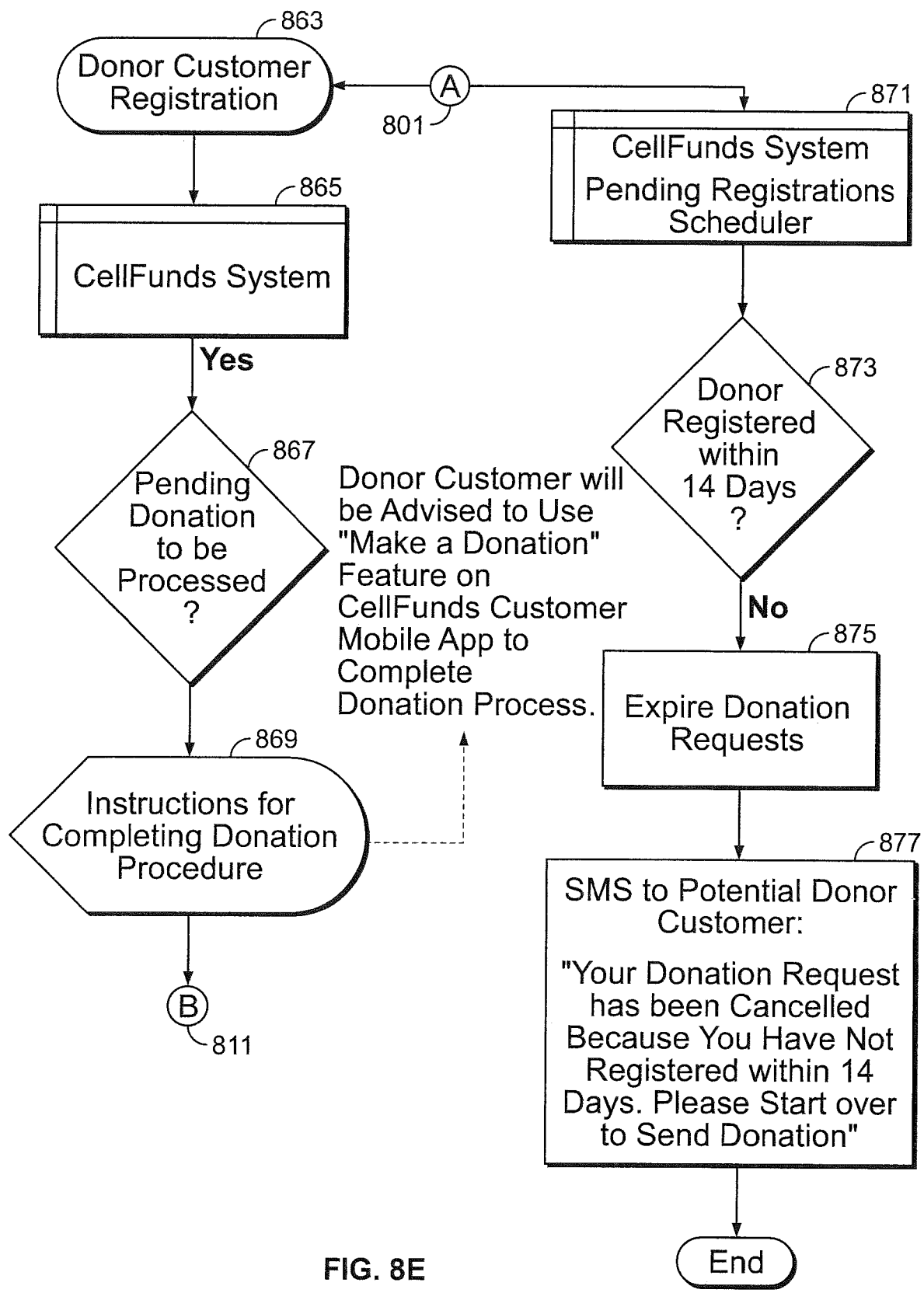
FIG. 8E is the continuation of the process flow from FIG. 8D illustrates the process flow for a non-CellFunds customer registers to make a donation.

FIG. 8E is the continuation of the process flow from FIG. 8D illustrates the process flow for a non-CellFunds customer registers to make a donation.

Now referring to FIG. 8E, starting at node "A" (861), donor customer registration (863) is setup by through the CellFunds system by registering a CellFunds account via the system website and downloading the CellFunds customer mobile App (865). Once the CellFunds account for the donor has been registered (865) ("YES"), the pending donation that was submitted in FIG. 8D (855), is then processed (867) and instructions for completing the donation procedure (869) are provided proceeding from "B" in FIG. 8E into FIG. 8A, which as described earlier illustrates the process for making a donation.

Alternatively, if the CellFunds system pending registrations scheduler (871) determines that the donor has not registered within 14 days (873), then the donation request expires (875). A text message is then sent to potential donor customer: "your donation request has been cancelled because you have not registered within 14 days. Please start over to send donation" (877)

Figure 9:
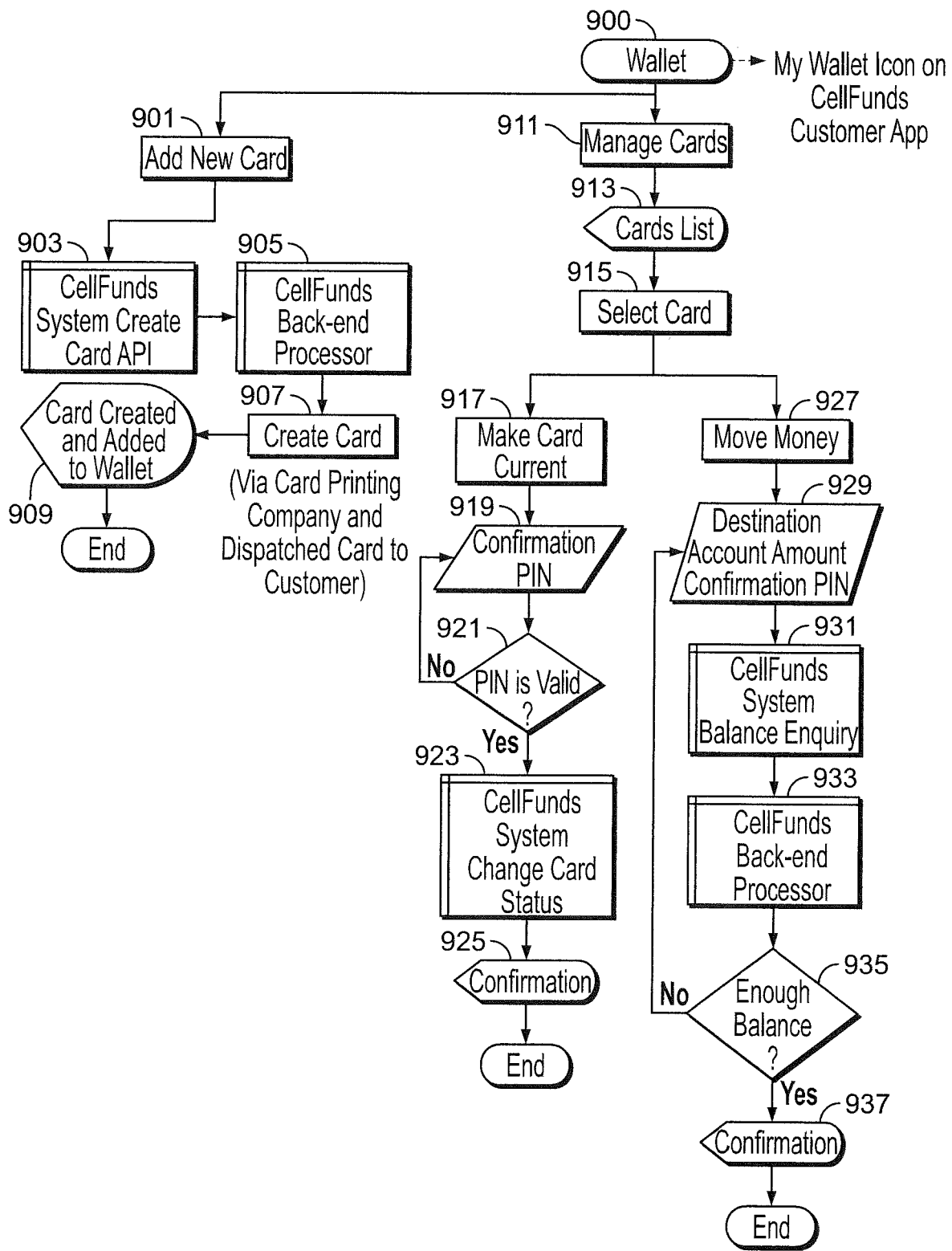
FIG. 9 is a flowchart illustrating a CellFunds Customer Managed Wallet Transaction Flow" process flow.

FIG. 9 illustrates the CellFunds customer Manage Wallet Transaction Flow process flow embodiment. The CellFunds customer Manage Wallet Transaction Flow process flow supports the functionality of the CellFunds Digital Wallet (Wallet), allowing a CellFunds customer to manage multiple cards inside their single account through their smart phone and the CellFunds App. Transferred funds between cards and the wallet are available real time. A CellFunds Wallet functionality allows customers to provide funds to their family members through additional CellFunds cards held in the CellFunds Wallet and managed with their smart phone. The Wallet allows the customers to distribute money with their smart phone and monitor the use of the money through their personal CellFunds website.

Referring now to FIG. 9, the digital wallet is available to any CellFunds account holder through the My Wallet icon (900) on the CellFunds App via their smart phone. The default Wallet holds one card and the wallet can hold an "unlimited" number of cards owned by the CellFunds customer. CellFunds System enables customers to add cards to the wallet through the Add a Card (901) option inside the wallet. This is executed by sending API codes (903) to the back end processor (905) who issues the cards (907) on behalf of the issuing bank. The issued card is then added to the account holder's wallet (909).

This process flow starting at (911), supports managing the cards in the wallet by use of the customer's cell phone via the CellFunds App.

The wallet itself can be designated as a holder of money (not associated to any cards). The wallet has an internal number associated with it. The customer designates which card, or the wallet, will function as the current card/wallet. The current card/wallet is the doorway into and out of the wallet for transactions that influence the total account balance. Any Send, Deposit, Withdrawal or Purchase transaction impacts the account balance. Any change in the account balance is reflected in the balance of that which is designated as current in the wallet.

In practice, the customer selects the My Wallet icon (900) from the CellFunds App and then is presented with a cards list (913) and selects "Manage" (915) next to select the sending card or wallet to be made "Current". The customer next selects "Make Card Current" (917) and a confirmation PIN is entered (919) to confirm the choice. If the PIN entered by the customer is valid (921), the CellFunds system then changes the current card status (925) providing a confirmation (925).

A transfer of money between the cards in the wallet, or between the wallet and a card does not impact the total account balance. A customer can elect to move money as explained below.

The "move money" process starts by the customer selecting the sending card from the card list (915) as explained earlier. Next, the customer selects "Move Money" (927) and then Select Destination Account (929) from the dropdown list.

Then the customer enters the amount to transfer, along with a PIN to confirm the transfer. The CellFunds system then performs a balance inquiry (931), through CellFunds back-end processor (933). Provided there is enough balance for the transfer (935) ("YES"), then the customer is provided a confirmation (937) of the transfer. A Balance Command icon in the CellFunds App (not illustrated) returns the balances for each card in the wallet.

It is noteworthy that the "Manage Wallet Transaction" process flow, above, is executed via the customer's smart phone. Transfers are effective real time. The account holding customer manages the wallet and has access to all historical activities by the cards or the wallet through the CellFunds customer's personal website accessible at www.cellfunds.com.

Physical cards can be given to individuals to use. This is primarily for giving money to friends or family where the account holder wants to manage the money and monitor its use.

In geographic areas where plastic cards are not used, or are used in limited numbers, such that there are numerous CellFunds customers without cards, the numbers associated with the wallet "cards" will be assigned to cell phone numbers and those cell phones will be able to make purchases following the normal cell phone purchase procedures through the CellFunds App.

We claim:

1. A mobile banking method which permits unbanked individuals having a mobile banking system account to at least make deposits or withdrawals to other registered members of the mobile banking system, comprising:
   providing a registration capability for the unbanked individual to interact with a mobile banking system web application, or to download system software to a mobile device or PC, wherein said unbanked individual can interact with the mobile banking system web application or said downloaded system software by providing a unique cellphone ID, and one or more of a name, address, birthdate, social security number, tax identification number, wherein
   said registration information is passed to a back end processor of the mobile banking system to setup a registered system account for said unbanked individual as a customer, the registered system account identified by a cell phone number of the customer;
   issuing a debit card or a card number representing a debit card and issuing a registration number to said customer by the mobile banking system to activate a downloaded mobile banking system app, and issue an optional QR Code that can be displayed by the customer and read by the merchant, which would return the customer's name and picture if one was loaded during registration;
   allowing said mobile systems app to be activated using a cell phone number, the registration number, and a PIN selected by the customer, the PIN stored in the back-end processor and subsequently required to open the app, further comprising
   providing a registration capability for a merchant to be a customer merchant of the mobile banking system, the merchant able to interact with a mobile banking system web application, or to download system software to a mobile device or PC, wherein said merchant can interact with the mobile banking system web application or said downloaded system software by providing information a unique cellphone ID and one of more of a name, address, social security number, tax identification number of a combination thereof, wherein
   said registration information is passed to a system back end processor to setup a system account for said merchant as a merchant customer, the system account identified by a cell phone number of the merchant customer;
   optionally issuing a debit card and issuing a registration number to said merchant customer by the mobile banking system to activate a mobile banking system app, the merchant customer receiving a system merchant number and optionally, a QR code for displaying to the customer, and
   allowing said mobile banking system app to be activated using the merchant customer cell phone number, the registration number, and a PIN selected by the merchant customer, the PIN stored in the back-end processor and subsequently required to open the mobile banking system app, and
   providing a capability for the customer to make a deposit to a merchant customer using the mobile banking system;
   providing a lookup of customer merchants in the mobile banking system app or receiving a physical location of the customer merchant by the mobile banking system app;
   sending an API code to the back end processor to find a customer merchant in a vicinity of the customer having sufficient funds in a system account of the customer merchant to process the deposit; wherein,
   sending a message to said customer merchant with the name and picture of said customer requesting a deposit, which is displayed on a system merchant app, loaded on said merchant's smart phone, tablet or PC; wherein,
   said system, through an API connection using the API codes to a back end processor, debits merchant's system account and credits the customer's system account, moving the deposit amount from said merchant to said customer.

2. The method of claim 1, further comprising permitting a customer to withdraw money from a customer registered system account using a merchant customer, the customer receiving the money as a result of the withdrawal using the merchant customer, wherein the step of withdrawing money from a merchant customer further comprises:

providing a lookup of customer merchants in the mobile banking system or receiving a physical location of the customer merchant by the mobile banking system app;

sending the API codes to the back end processor to find a customer merchant in a vicinity of the customer having sufficient funds in a system account of the customer merchant to process the withdrawal; wherein, sending a message to said customer merchant with the name and picture of said customer requesting a withdrawal, which is displayed on a system merchant app, loaded on said merchant's smart phone, tablet or PC; wherein, said system, through an API connection using the API codes to a back end processor, debits the customer's system account and credits the merchant's system account, moving the withdrawal amount from the merchant to the customer.

3. The method of claim 1, further comprising:

providing a capability wherein a customer makes a send money transaction to a remittance receiver;

after receiving a customer execution of a send transaction request from said mobile banking system app, the mobile banking system checks, through a back end system processor, whether said sending customer has a sufficient account balance to complete the send transaction;

whereby, provided that said sending customer has sufficient account balance, confirmation information is communicated to said customer, said confirmation information indicating that said remittance receiver is a mobile banking system customer, then the mobile banking system sends the customer a confirmation of system remittance receiver's name, mobile phone number, and the amount of the of the send transaction request on the mobile banking system app of said customer; whereby, provided said confirmation information is correct, and a confirm send transaction request is received, the system verifies an entered PIN, and the system checks whether sending and system remittance receiver accounts are issued by the same or different processors, provided said sending and system remittance receiver accounts are issued by the same processor, said system executes a send transaction; whereby said system sends API codes to a back end processor authorizing a debit to said customer's system account for said sending amount and a corresponding credit to said system remittance receiver's system account.

4. The method of claim 3, wherein said system determines that said remittance receiver is not a customer of the mobile banking system; wherein, said system via said back end processor, withdraws said sending amount and holds it in a reserve account; wherein, said remittance receiver is prompted via a mobile phone to register as a system customer within a system timeframe; wherein, provided that remittance receiver establishes a registered system account within said system timeframe, then the sending amount is credited to said remittance receiver's registered system account.

5. The method of claim 3, whereby said remittance receiver is not a system customer and the sending amount is designated to be sent to said remittance receiver's bank; wherein, after the mobile banking system receives remittance receiver's bank routing number and said remittance receiver's bank account and a PIN of the customer to confirm said send transaction request, the mobile banking system, via said the back end processor, withdraws said sending amount and holds it in a reserve account until an ACH is executed through said system's back end processor crediting said remittance receiver's bank account with said sending amount.

6. The method of claim 3, whereby both said customer and said remittance receiver are registered system account holders, and the mobile banking system determines that said customer and said remittance receiver accounts are issued by the different processors;

said system then executes a send transaction, via API instructions, to the customer's back end processor, authorizing a debit to said sending customer for said sending amount and a credit to said system's funding account for the corresponding amount, wherein, said system additionally sends API instructions to said system remittance receiver's back end processor authorizing a debit to said system's funding account for said sending amount and a credit to said system remittance receiver's account for the corresponding amount; wherein, ACH transactions are periodically issued to settle said funding accounts for the net amount of said send transaction between said different processors, wherein, said system sends said sending and said system remittance receiver's notifications regarding remittance completion.

7. The method of claim 1, further comprising providing a capability for a customer to make a purchase transaction from a merchant customer; wherein, after the mobile banking system receives a purchase option from a customer's mobile banking system app and receives a merchant code or a captured QR code of the merchant customer, or notes capturing of the QR code of the customer by the merchant customer;

the system then returns the name of the merchant to the customer and/or the name and the picture of the customer, to the merchant; wherein after receipt of a PIN of the customer, the system responds, sending a message to the merchant customer, with the name and/or the name and the picture of said customer requesting the purchase, and prompts for entering of purchase information by the merchant, then displays purchase details on the merchant app, which is loaded on the merchant's smart phone, tablet or PC; wherein, the system receives acknowledgement of said customer's purchase request and executes the purchase by returning the merchant's PIN, on said merchant app; wherein, the system sends the API codes system's back end processor to determine if the customer's and merchants' cards accounts are issued by the same processor or by different processors; wherein, if the customer and merchant's card account are issued by the same processors, then said system sends API codes to the back end processor, authorizing a debit to the customer's system account for the amount of the purchase, and a credit for the merchant's system account for the same amount, along with confirmation information to both customer and merchant.

8. The method of claim 7 wherein the system determines that customer and merchant's card account are issued by the different processors; wherein, the system sends API codes to the customer's back end processor, authorizing a debit to the purchasing customer's system account for the amount of the purchase and a credit to the system's funding account for the same amount in real time; and wherein, the system sends API codes to the merchant customer's back end processor, authorizing a debit to the system's funding account for the amount of the purchase, and a credit to the merchant customer's system account for the amount of the purchase.

9. The method of claim 1, further comprising providing a default wallet system, wherein the mobile banking system permits transferring a registered system account holder's funds between cards in the default wallet system, wherein money can be transferred from a selected card in the default wallet system to one or more other cards, or held in the wallet, not associated to a card, the one or more other cards can be used to disburse money on the cards to individuals.

10. The method of claim 9, wherein the individual is not a customer of the mobile banking system.

11. A mobile banking system having the following capability:

providing a registration capability for the unbanked individual to interact with a mobile banking system web application, or to download system software to a mobile device or PC, wherein said unbanked individual can interact with the mobile banking system web application or said downloaded system software by providing a unique cellphone ID, and one or more of a name, address, birthdate, social security number, tax identification number, wherein said registration information is passed to a back end processor of the mobile banking system to setup a registered system account for said unbanked individual as a customer, the registered system account identified by a cell phone number of the customer;

issuing a debit card or a card number representing a debit card and issuing a registration number to said customer by the mobile banking system to activate a downloaded mobile banking system app, and issue an optional QR Code that can be displayed by the customer and read by the merchant, which would return the customer's name and picture if one was loaded during registration;

allowing said mobile systems app to be activated using a cell phone number, the registration number, and a PIN selected by the customer, the PIN stored in the back-end processor and subsequently required to open the app, further comprising providing a registration capability for a merchant to be a customer merchant of the mobile banking system, the merchant able to interact with a mobile banking system web application, or to download system software to a mobile device or PC, wherein said merchant can interact with the mobile banking system web application or said downloaded system software by providing information a unique cellphone ID and one of more of a name, address, social security number, tax identification number of a combination thereof, wherein said registration information is passed to a system back end processor to setup a system account for said merchant as a merchant customer, the system account identified by a cell phone number of the merchant customer;

optionally issuing a debit card and issuing a registration number to said merchant customer by the mobile banking system to activate a mobile banking system app, the merchant customer receiving a system merchant number and optionally, a QR code for displaying to the customer, and allowing said mobile banking system app to be activated using the merchant customer cell phone number, the registration number, and a PIN selected by the merchant customer, the PIN stored in the back-end processor and subsequently required to open the mobile banking system app, and providing a capability for the customer to make a deposit to a merchant customer using the mobile banking system;

providing a lookup of customer merchants in the mobile banking system app or receiving a physical location of the customer merchant by the mobile banking system app;

sending an API code to the back end processor to find a customer merchant in a vicinity of the customer having sufficient funds in a system account of the customer merchant to process the deposit; wherein, sending a message to said customer merchant with the name and picture of said customer requesting a deposit, which is displayed on a system merchant app, loaded on said merchant's smart phone, tablet or PC; wherein, said system, through an API connection using the API codes to a back end processor, debits merchant's system account and credits the customer's system account, moving the deposit amount from said merchant to said customer.

12. The mobile banking system of claim 11, wherein customers are permitted to deposit money to the customer's registered system account using a credit union by providing an account number/sub account number to said customer; wherein, the sub account number is generated by the system and linked to said customer's cell phone number, which is combined with a timestamp to create a unique deposit transaction reference number; wherein, after a deposit is made at the credit union, a confirmation of said deposit is made by said system, wherein a deposit transaction by said credit union is made using the API codes to said system's back end server to debit the deposit amount to system account and credit said deposit amount to said customer.

13. The mobile banking system of claim 11, wherein said mobile banking system permits customers to make a purchase at the merchant customer by receiving a purchase option from said customer and identification of the merchant using a merchant code or QR code of the merchant customer, the system then returns the name of the merchant to the customer and/or the name and the picture of the customer, to the merchant; and after receipt of a customer PIN, the system responds, sending a message to the merchant customer, with the name and/or the name and the picture of said customer requesting the purchase, and enters, and subsequently displays purchase details on a merchant customer App, which is loaded on the merchant's smart phone, tablet or PC; wherein, the system sends an API code to the system's back end processor to determine if the customer's and merchants' cards accounts are issued by the same processor or by different processors; wherein, if the customer and merchant's card account are issued by the same processors, then said system sends an API code to the back end processor, authorizing a debit to the customer's system account for the amount of the purchase, and a credit for the merchant's system account for the same amount, along with confirmation information to both customer and merchant.

14. The mobile banking system of claim 11, wherein the mobile banking system permits sending money from the customer registered system account holder to a remittance receiver; wherein the system receives a send transaction request from a mobile banking system app and the system checks, through a back end system processor, whether said sending customer has sufficient account balance to complete the send transaction; whereby, provided that said sending customer has sufficient account balance, confirmation information is communicated to said sending customer; whereby, provided said confirmation information indicates that said remittance receiver is a mobile banking system customer, then said mobile banking system sends a customer a confirmation of system remittance receiver's name, mobile phone number, and the amount of the send transaction request on said mobile banking system app of said sending customer; whereby, the system verifies an entered PIN, and the system checks whether sending and system remittance receiver accounts are issued by the same or different processors, whereby, provided said sending and system remittance receiver accounts are issued by the same processor, then said system executes a send transaction; whereby, said system sends API codes to a back end processor authorizing a debit to said sending customer's system account for said sending amount and a corresponding credit said system remittance receiver's system account.

15. The mobile banking system of claim 11, wherein the mobile banking system permits transferring the customer registered system account holder's funds between multiple system account issued cards in a default wallet system, wherein money can be transferred from a selected card in the default wallet system to one or more other cards for disbursement of the one or more other cards to one or more individuals for using money on the cards, or the money can be retained in the wallet and not assigned to cards.

16. The mobile banking system of claim 11, having additional capabilities of:

permitting a customer to make a purchase at a merchant customer;

permitting sending money from a registered system account holder to a remittance receiver; and permitting establishing multiple cards within a registered system account and allowing transferring funds between the multiple cards and use of funds in one or more of the multiple cards by individuals.

* * * * *